US012791775B2

(12) United States Patent
Brown et al.

(10) Patent No.: US 12,791,775 B2
(45) Date of Patent: Nov. 10, 2026

(54) WIRE GRID POLARIZER WITH REFLECTION CONTROL HAVING HIGH ABSORBANCE LAYER AND HIGH REFLECTIVITY LAYER

(71) Applicant: HOYA Optical Labs of America, Inc., Lewisville, TX (US)

(72) Inventors: Jeffrey Brown, Ramsey, MN (US); James Mulligan, Ramsey, MN (US); Michael Marshall, Ramsey, MN (US); Michael S. Boulineau, Ramsey, MN (US); Sandy Goebel, Ramsey, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 416 days.

(21) Appl. No.: 17/367,226

(22) Filed: Jul. 2, 2021

(65) Prior Publication Data

US 2022/0026613 A1 Jan. 27, 2022

Related U.S. Application Data

(60) Provisional application No. 63/048,575, filed on Jul. 6, 2020.

(51) Int. Cl.

*G02B 5/30* (2006.01)
*G02B 1/08* (2006.01)

(Continued)

(52) U.S. Cl.

CPC ............. *G02B 5/3058* (2013.01); *G02B 1/08* (2013.01); *G02B 5/3041* (2013.01); *G02C 7/12* (2013.01); *G02F 1/133548* (2021.01)

(58) Field of Classification Search

CPC ...... G02B 1/08; G02B 5/3041; G02B 5/3058; G02B 2027/0178; G02C 7/12; G02F 1/133548

See application file for complete search history.

(56) References Cited

U.S. PATENT DOCUMENTS

| | | | | |
|---|---|---|---|---|
| 5,294,518 A * | 3/1994 | Brady | ...................... | G11B 7/24 |
| 7,570,424 B2 | 8/2009 | Perkins et al. | | |

(Continued)

FOREIGN PATENT DOCUMENTS

| | | |
|---|---|---|
| JP | 2012181420 A | 9/2012 |
| JP | 2013057820 A | 3/2013 |

(Continued)

OTHER PUBLICATIONS

WIPO, U.S. International Search Authority, International Search Report and Written Opinion mailed Oct. 28, 2021 in International Patent Application No. PCT/US2021/1040377, 14 pages.

(Continued)

*Primary Examiner* — Ryan S Dunning

(74) *Attorney, Agent, or Firm* — Inskeep IP Group, Inc

(57) ABSTRACT

A wire grid polarizer comprises parallel grids of composite wires wherein each grid includes a coating stack having at least one high refractive index material coated on an aluminum layer. The coating stack comprising at least one high refractive index material reduces the reflection of the wire grid polarizer from between 40-50% to between 5-10%. Possible candidates for the high refractive index materials include Ge, Si and alloys of these materials having refractive indices greater than 3 with extinction coefficients above 0.2.

28 Claims, 17 Drawing Sheets

(51) Int. Cl.
*G02C 7/12* (2006.01)
*G02F 1/1335* (2006.01)

(56) References Cited

U.S. PATENT DOCUMENTS

| | | | | |
|---|---|---|---|---|
| 7,771,045 | B2 | 8/2010 | Matera et al. | |
| 7,804,042 | B2 * | 9/2010 | Li | B23K 26/18 438/45 |
| 8,804,241 | B2 | 8/2014 | Wu et al. | |
| 10,527,768 | B2 | 1/2020 | Takahashi | |
| 10,859,743 | B2 | 12/2020 | Takeda | |
| 2004/0125449 | A1 * | 7/2004 | Sales | G02B 5/3058 359/485.05 |
| 2008/0186576 | A1 * | 8/2008 | Takada | G02B 5/3025 349/5 |
| 2008/0316599 | A1 | 12/2008 | Wang et al. | |
| 2010/0091236 | A1 * | 4/2010 | Matera | B29D 11/00634 264/1.32 |
| 2014/0063467 | A1 | 3/2014 | Takahashi et al. | |
| 2015/0015948 | A1 * | 1/2015 | Takada | G02B 5/3058 216/2 |
| 2018/0252854 | A1 | 9/2018 | Takahashi | |
| 2019/0079234 | A1 * | 3/2019 | Takagi | G02B 27/0101 |
| 2019/0094436 | A1 | 3/2019 | Takeda | |
| 2019/0179169 | A1 | 6/2019 | Clerc et al. | |
| 2021/0033767 | A1 * | 2/2021 | Nielson | G02B 5/3058 |

FOREIGN PATENT DOCUMENTS

| | | | |
|---|---|---|---|
| JP | 2013200482 | A | 10/2013 |
| JP | 2014139664 | A | 7/2014 |
| JP | 5929860 | B2 | 6/2016 |
| JP | 2017-102137 | A | 6/2017 |
| JP | 2019028463 | A | 2/2019 |
| JP | 2019-061047 | A | 4/2019 |
| JP | 2019124970 | A | 7/2019 |
| KR | 2013-0106052 | A | 9/2013 |

OTHER PUBLICATIONS

Japan Patent Office, Office Action dated May 14, 2025 with English Translation in Japanese Patent Application No. 2023-501207, 16 pages.

European Patent Office, Extended European Search Report dated Jun. 21, 2024 in European Patent Application No. 21837560.8, 8 pages.

Japan Patent Office, Notice of Allowance dated Jun. 2, 2026 with English Translation in Japan Patent Application No. 2025-2023-501207, 6 pages.

* cited by examiner

ZrOxNy Coating

| N2 Flow | O2 Flow | Ellipsometry at 550 nm n | Ellipsometry at 550 nm k |
|---|---|---|---|
| 5 | 1.00 | 2.2500 | 0.8870 |
| 5 | 1.10 | 2.4921 | 0.7841 |
| 5 | 1.25 | 2.5090 | 0.4095 |
| 5 | 2.00 | 2.3843 | 0.1455 |
| 5 | 3.50 | 2.3100 | 0.0260 |
| 5 | 4.00 | 2.2672 | 0.0066 |

| | | | | |
|---|---|---|---|---|
| Zr Index | | 2.5315 | 3.3600 | refractive index info (Querry) |
| | | | | |
| Al MyCoat | | 1.4874 | 5.5179 | |
| Al Ideal | | 0.7894 | 5.8519 | refractive index info (McPeak) |
| Al Ideal | | 1.0152 | 6.6276 | refractive index info (Rakic) |

| n | k | d (nm) | Real | Imag |
|---|---|---|---|---|
| 2 | 0.5 | 62 | 1.006 | -0.027 |
| 2.5 | 0.46 | 45 | 0.967 | -0.002 |
| 3 | 0.43 | 34 | 1.004 | 0.022 |
| 3.5 | 0.39 | 27 | 1.010 | 0.033 |
| 4 | 0.34 | 22 | 1.006 | 0.048 |
| 5 | 0.25 | 15 | 0.993 | -0.046 |

Refractive Indices

| | | Ellipsometry at 550 nm | |
|---|---|---|---|
| N2 Flow | O2 Flow | n | k |
| 5 | 1.00 | 2.2500 | 0.8870 |
| 5 | 1.10 | 2.4921 | 0.7841 |
| 5 | 1.25 | 2.5090 | 0.4095 |
| 5 | 2.00 | 2.3843 | 0.1455 |
| 5 | 3.50 | 2.3100 | 0.0260 |
| 5 | 4.00 | 2.2672 | 0.0066 |

| | | | | |
|---|---|---|---|---|
| Zr Index | | 2.5315 | 3.3600 | refractive index info (Querry) |
| | | | | |
| Al MyCoat | | 1.4874 | 5.5179 | |
| Al Ideal | | 0.7894 | 5.8519 | refractive index info (McPeak) |
| Al Ideal | | 1.0152 | 6.6276 | refractive index info (Rakic) |
| Ge | | 5.226 | 2.106 | |
| Si - Crystalline | | 4.1000 | 0.0410 | refractive index info |
| Si - Amorphous | | 4.3889 | 0.7707 | refractive index info |
| Si Flim MyCoat | | 3.2679 | 0.2801 | |

WIRE GRID POLARIZER WITH REFLECTION CONTROL HAVING HIGH ABSORBANCE LAYER AND HIGH REFLECTIVITY LAYER

RELATED APPLICATIONS

This application claims benefit of and priority to U.S. Provisional Application Ser. No. 63/048,575 filed Jul. 6, 2020 entitled WGP Reflection Control, which is hereby incorporated herein by reference in its entirety.

BACKGROUND OF THE INVENTION

Polarizing functionality for optical lenses is required to be transmissive by virtue of its use as an eye lens and is typically provided by use of a stretched polyester or polyvinyl alcohol, PVA, film that is subsequently imbibed with a conductive material such as iodine or suitable organic dye. Such stretched film polarizing sheets can have up to 99.9 percent polarizing efficiency. However, at such high levels of efficiency, the optical transmission is typically reduced to a level close to 20 percent. By virtue of the how ophthalmic lenses are used the polarizing film material is integral with the lens itself.

Another type of polarizing filter is a wire grid polarizer that typically uses fine metal wires lithographically deposited a short distance apart from each other on a substrate. Due to their high thermal stability, wire grid polarizers are typically used in video projection systems, medical imaging, and digital cameras. Wire grid polarizers are much less common for use in eyewear due to its relative expense compared to other common polarizing techniques and because these metal grids tend to reflect incident light back into a wearer's eyes, causing visual disturbances. Hence, wire grid polarizers have remained less popular with eyeglass manufactures due to this expense and unfavorable reflective performance characteristics.

Hence, there is a need to develop an improved wire grid polarizer that is both less expensive to manufacture and has reduced reflectance on the backside of an optical lens.

SUMMARY OF THE INVENTION

The present invention describes a wire grid polarizer for polarizing an incident light beam, comprising an array of parallel composite wires. In some embodiments, each of the composite wires comprise a coating stack having at least one high refractive index material layer coated on a low refractive index metal layer, wherein the coating stack is configured to reduce a back reflection of the wire grid polarizer below 6%.

According to some embodiments, the high refractive index material layer of the wire grid polarizer comprises a first thickness of about 20 nm and the low refractive index metal layer comprises a second thickness of about 27.5 nm. In some embodiments, the coating stack comprises a total thickness of about 47.5 nm. According to some embodiments, the wire grid polarizer is a polarized mirror sun lens having a single surface reflection control when the coating stack comprises the total thickness of about 47.5 nm.

According to some embodiments, the coating stack of the wire grid polarizer comprises a total thickness of about 67.5 nm when the low refractive index metal layer comprising the second thickness of about 27.5 nm is sandwiched between two high index material layers having the first thickness of about 20 nm. In some embodiments, the wire grid polarizer functions as a dual direction reflection controller when the coating stack comprises the total thickness of about 67.5 nm.

In some embodiments, when the wire grid polarizer is a dual direction reflection controller, a spacing between the array of parallel composite wires increases by decreasing a duty cycle below 50% by raising pillar width to total period width.

According to some embodiments, the high index material of the wire grid polarizer comprises a thickness of about 20 nm and comprises germanium having a refractive index of 4.5 with an extinction coefficient of 1.7. In some embodiments, the high index material layer of the wire grid polarizer comprises a germanium layer, a silicon layer or a layer comprising alloys of germanium and silicon.

In some embodiments, an optical lens of the present invention comprises: a wire grid polarizer having a substrate with a surface; an array of parallel wires disposed on the surface of the substrate. Each of the wires of the wire grid polarizer comprises a coating stack having at least one high refractive index material layer. The coating stack of the wire grid polarizer is configured to reduce a back reflection of the optical lens below 6% when the wire grid polarizer is embedded in a laminate.

In some embodiments, when the coating stack of the wire grid polarizer comprises a total thickness of about 47.5 nm, the optical lens appears as a colored mirror towards an observer and back-reflects light below 2% to a wearer's eyes. According to some embodiments, the coating stack of the optical lens is configured to reduce the back reflection of the optical lens to 2% when the glass substrate of the wire grid polarizer comprises a back surface reflection of 4%.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
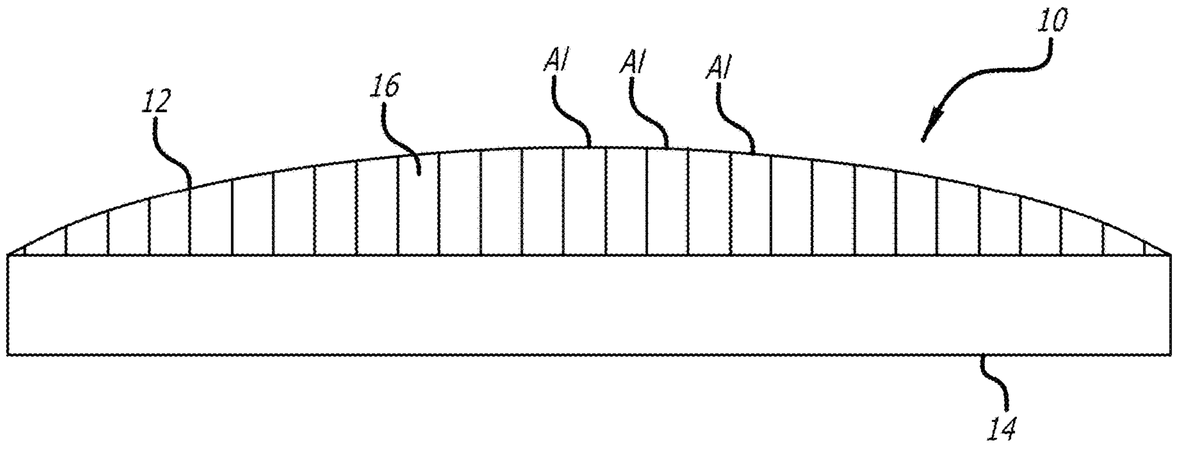
FIG. 1 is an elevation view of an ophthalmic article according to certain embodiments of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements. While different embodiments are described, features of each embodiment can be used interchangeably with other described embodiments. In other words, any of the features of each of the embodiments can be mixed and matched with each other, and embodiments should not necessarily be rigidly interpreted to only include the features shown or described.

One aspect of the present invention seeks to generate a wire grid polarizer filter with reduced backside reflection to the wearer's eyes and a mirror like appearance of the front side of the filter to an observer. This can be achieved by coating the high reflectivity aluminum (Al) grid of the wire grid polarizer with a component which has high absorbance. The non-limiting examples of components having high absorbance include zirconium (Zr), nickel (Ni) or germanium (Ge).

Broadly speaking, the present invention achieves the formation of wire grid polarizers that polarize electromagnetic radiation in a range of wavelengths that is within the visible spectrum, e.g. approximately 380 to 780 nanometers. This objective is achieved by first forming a structured surface on an ophthalmic or optical article, such as a lens, a film, or a film laminate. The structured surface may employ a system of linear patterns or features ranging in the scale of nanometers to hundreds of nanometers. U.S. Pat. No. 10,838,128 B2, the content of which is incorporated in its entirety by reference, also discloses the formation of wire grid polarizers that polarize electromagnetic radiation in visible range on an ophthalmic or optical article, such as a lens, a film, or a film laminate.

In certain embodiments of the present invention, the surface upon which the inventive wire grid polarizer is formed is a front or back surface of an unfinished, single or multifocal optical lens puck or a front or back surface of a finished, single or multifocal optical lens.

FIG. 1 is an elevation view of a finished or semi-finished lens 10, according to certain embodiments of the present invention, having a front side 12 and a back side 14. The lens 10 employs a surface structure 16 on the front surface 12 that was formed either during the lens molding process or as a result of direct surfacing of the front side 12. In some embodiments of the present invention, the surface structure 16 comprises coating the front surface 12 with high reflectivity aluminum (Al) grids.

In some embodiments, the present invention demonstrates a wire grid polarizer with Al grids for use in an optical lens which may reduce the back reflection. To achieve this back reflection control, an additional absorbing metal layer, for example but not limited to Zr or Ni layer, deposited on the Al wires covered with a dielectric layer which includes but not limited to a $SiO_2$ gap or spacer layer. The presence of additional absorbing metal layers on Al grids is effective in reducing reflectance of the wire grid polarizers made of high reflectivity Al grids.

Figure 2:
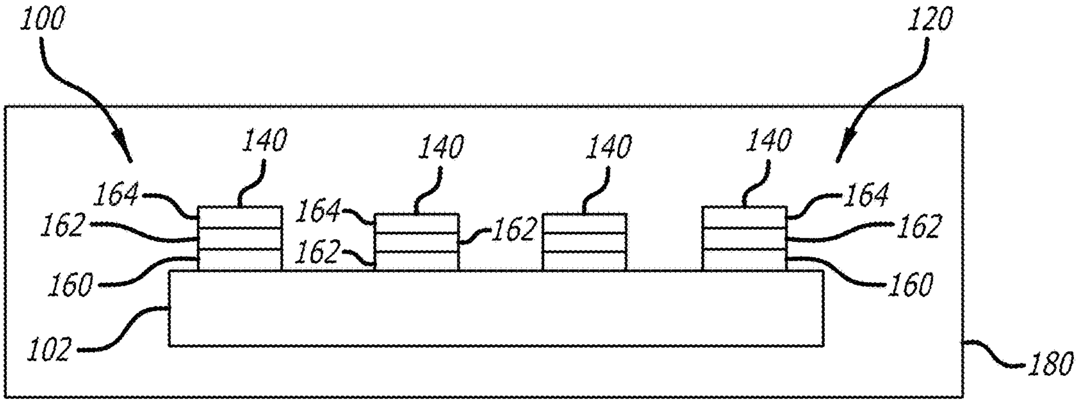
FIG. 2 is a sectional view of one example of a wire grid polarizer deposited on a glass substrate of a lens.

FIG. 2 illustrates one embodiment of a lens stack 100 comprising a base lens blank 102 (also referred to as a substrate) and a wire grid polarizer 120 disposed on a front surface of the lens blank 102. The lens blank 102 can be polycarbonate, glass, or other materials suitable for use as an ophthalmic lens.

The wire grid polarizer 120 generally includes a plurality of fine metal wires or composite metal lines 140 that have been deposited by E-Beam evaporation, standard thermal evaporation, sputtering or lithographically on the lens blank or substrate 102 in a parallel orientation relative to each other. These metal wires can be spaced apart from each other between 40 and 150 nm. In a specific example, the metal wires are spaced apart about 60 nm.

Each of the wires or composite metal lines 140 of the wire grid polarizer 120 comprise a first metal layer 160 deposited directly on the surface of the lens or substrate 102, a dielectric layer 162 deposited on the first metal layer 160, and a second metal layer 164 deposited on the dielectric layer 162.

In some embodiments, the wire grid polarizer 120 with the lens blank 102 is embedded in a laminate 180. In some embodiments, non-limiting examples of the laminate comprises a polyurethane adhesive contained between two sheets of polycarbonate.

In some embodiments, the first metal layer 160 includes but is not limited to Al. The thickness of each aluminum layer may have a range between 10-30 nm. Al layer comprises a low refractive index of about 0.789 to 1.015 at 550 nm depending on the deposition process or the quality of the Al. Therefore, Al is a high reflectivity metal even at low thickness. The Al grids in the wire grid polarizer can be spaced apart from each other between 40 and 150. In a specific example, the metal wires are spaced apart about 60 nm.

The dielectric layer 162 includes but is not limited to $SiO_2$. The thickness of the $SiO_2$ layer may vary in a range between 1-120 nm. By varying the thickness of the $SiO_2$ layer, the reflection can be minimized. In this regard, high refractive index means an index of refraction that is approximately greater than about 1.7 at a referenced wavelength, for example a wavelength of about 550 nanometers. Low refractive index means an index of refraction that is approximately less than about 1.5 at a referenced wavelength, for example a wavelength of about 550 nanometers. For this example, the refractive index of the $SiO_2$ layer is 1.5.

The second metal layer 164 includes but is not limited to Ni or Zr. The thickness of the Ni or Zr layer may vary. In one embodiment, a non-limiting example of the thickness of the Ni or Zr layer is 5 nm. Ni or Zr are high absorbing metals. Zr has a refractive index of 2.5315 and Ni has a refractive index of 1.8 at 550 nm.

In one specific example, the first metal layer is composed of Al having a thickness of 27.5 nm and spaced apart from other wires by 60 nm, the dielectric layer 162 is composed of $SiO_2$ and has a thickness of 65 to 70 nm, and the high absorbing second metal layer is composed of Zr and has a thickness of 7 nm.

In one example, the lens stack is formed by depositing the first metal layer (e.g., Al) via E-beam deposition, thermal evaporation or collimated sputtering.

In some embodiments, the basic structure for reflection control comprises a basic structure of Glass\Al\$SiO_2$\Zr layer, where glass is used as a substrate and on top surface of the glass substrate, a grid or array of parallel, elongated, composite wires are disposed (not shown in the figures). The thickness of the coated layer can be fixed or varied in the basic structure of Glass\Al\$SiO_2$\Zr. In some embodiments, the Zr thickness in the basic structure is fixed. In some embodiment, the thickness of the Zr includes but not limited to 5 nm but the thickness of the $SiO_2$ is varied. In the structure of Glass\Al\$SiO_2$\Zr, the Al layer thickness is made optically opaque so that the reflection could be measured from the back side (i.e., Al only) and the front side (i.e., Al+reflection control with Zr).

Figure 3:
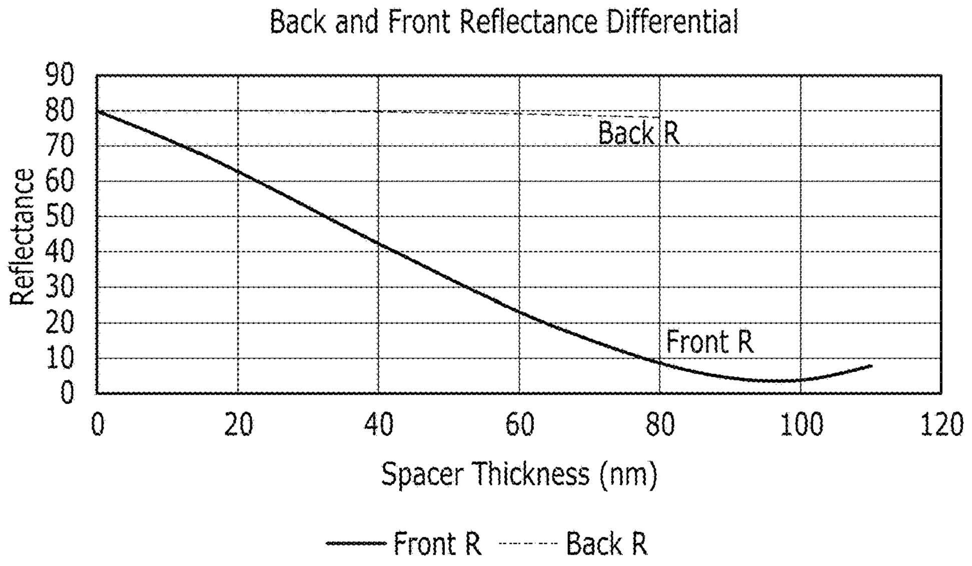
FIG. 3 is a reflection spectrum from a control Al layer and a layer of Glass\Al\$SiO_2$\Zr.

Modelling data for the back side reflection control demonstrates that by varying the thickness of the $SiO_2$ spacer layer in Glass\Al\$SiO_2$\Zr structure, the reflection of the wire grid polarizer can be minimized. Modelling data from FIG. 3 shows that the back side in the structure of Glass\Al\$SiO_2$\Zr, which only has an Al coating on the glass substrate shows high reflectance of a constant value of around 80. The front side in the structure of Glass\Al\$SiO_2$\Zr comprises reflection control coating of $SiO_2$\Zr on the Al grids. With increasing thickness of $SiO_2$ between 0 to 120 nm and at fixed 5 nm thickness of Zr layer, the front side reflectance of the wire grid polarizer reduces from about 80 to below 5.

In some embodiments of the present invention, the theoretical concept of the coating layer obtained by the modelling data in FIG. 3 is applied on a wire grid polarizer structure that uses Al grids on a glass substrate. The coating is applied at normal incidence in a small sputtering machine. The goal is to assess if additional high absorbing layer(s) coating on the Al grids, as predicted in the modelling data in FIG. 3, is a viable approach to reduce the reflection in aluminized areas while maintaining sufficient overall transmission.

In some embodiments, the structure in the coating comprises substrate+varied thicknesses of $SiO_2$\Zr\$SiO_2$ reflection control layer. In some embodiments, the thicknesses of individual metal or metal oxide in the reflection control layer include but is not limited to substrate\70 nm $SiO_2$\7 nm Zr\65 nm $SiO_2$. In the reflection control layer, the top $SiO_2$ layer provides an additional reduction in reflection.

Figure 4:
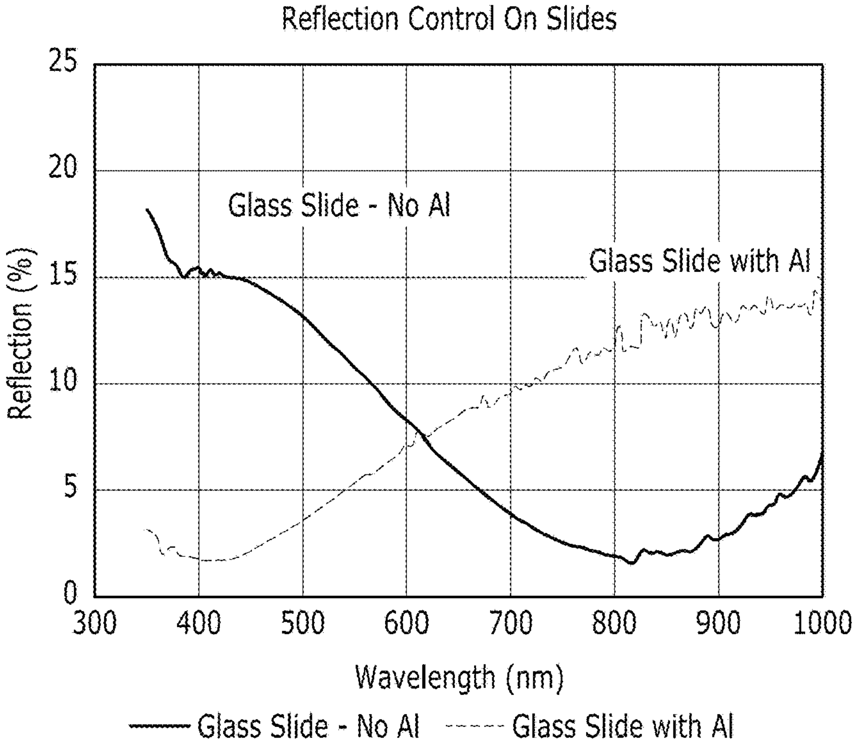
FIG. 4 is a reflection spectrum of a glass slide+$SiO_2$\Zr\$SiO_2$ reflection control layer (No Al layer present) and a glass slide+Al layer+$SiO_2$\Zr\$SiO_2$ reflection control layer.
Figure 5:
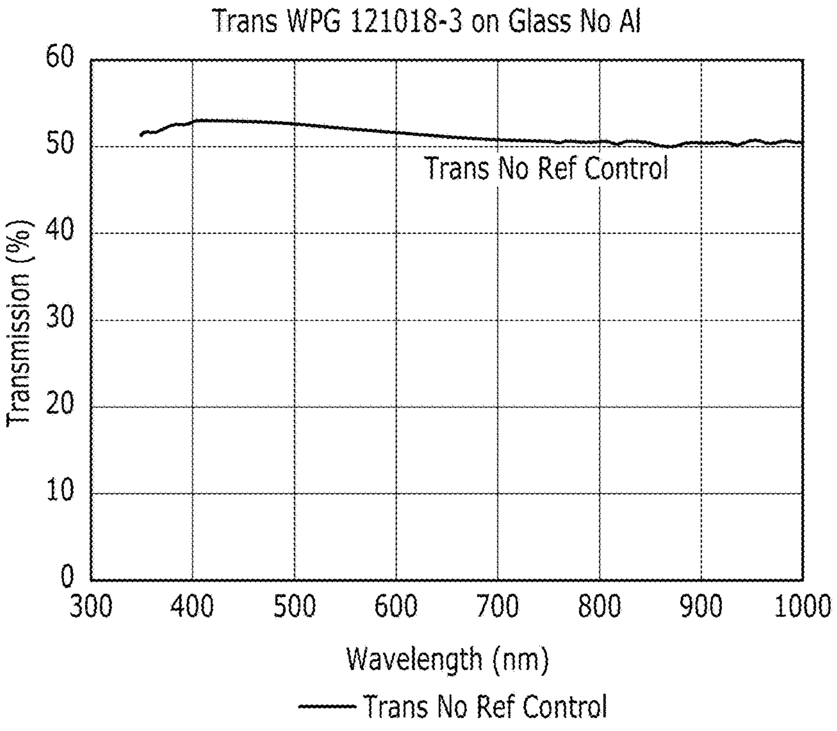
FIG. 5 is a transmission spectrum of a glass slide+$SiO_2$\Zr\$SiO_2$ reflection control layer (No Al layer present).

The reflection and transmission spectra for this design coated on glass are shown in FIGS. 4 and 5. As can be seen from FIG. 4, When there is no Al on the glass slide, the reflection spectra of the glass slide\70 nm $SiO_2$\7 nm Zr\65 nm $SiO_2$ coating layer increases from about 2% to 15% in the visible region. On the other hand, when Al on the glass slide is coated with reflection control layer, for example, 70 nm $SiO_2$\7 nm Zr\65 nm $SiO_2$ layer, the reflection of the glass slide-Al\70 nm $SiO_2$\7 nm Zr\65 nm $SiO_2$ decreases from about 18% to 2% in the visible region. The difference in the spectra for reflection measured through the glass or the surface of the glass is due to the refractive index of the glass relative to air on the opposite side and is expected. FIG. 5 shows the transmission spectrum of the glass slide+reflection control layer, i.e., glass slide\70 nm $SiO_2$\7 nm Zr\65 nm $SiO_2$ layer (no Al on the glass slide) reduces to a nearly constant value of about 50% in the visible region.

Figure 6:
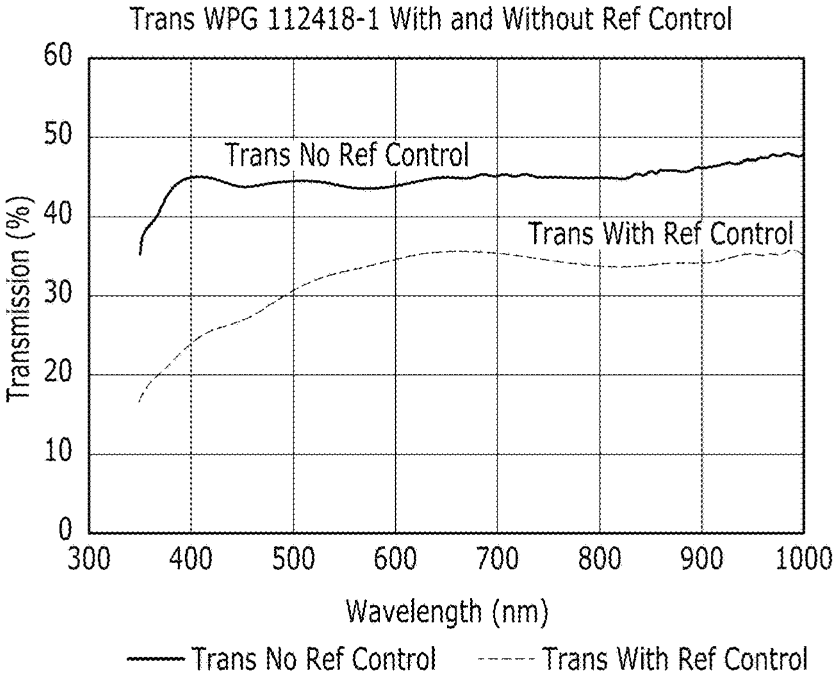
FIG. 6 is a transmission spectrum of a wire grid polarizer with the reflection control layer $SiO_2$\Zr\$SiO_2$ on glass slide+Al layer and without the reflection control layer $SiO_2$\Zr\$SiO_2$ on glass slide+Al layer.
Figure 7:
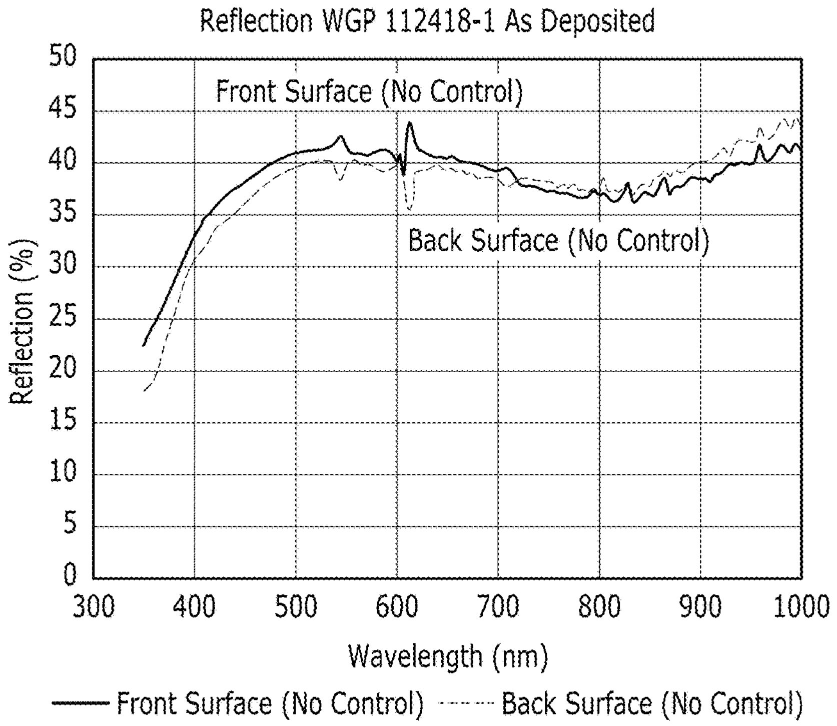
FIG. 7 is a reflection spectrum of a wire grid polarizer without the reflection control layer $SiO_2$\Zr\$SiO_2$ on the front and back sides of the glass slide+Al layer.
Figure 8:
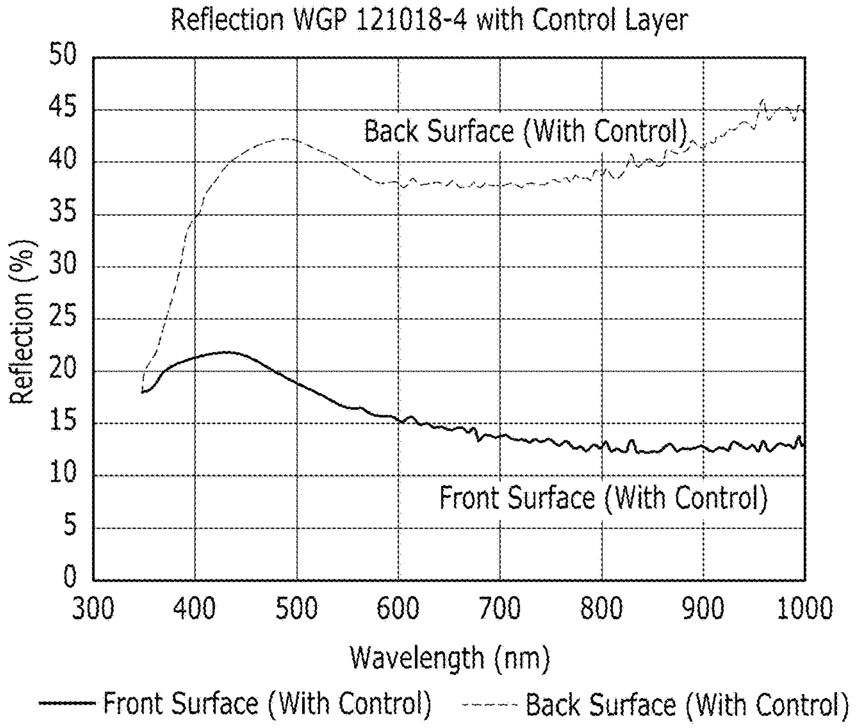
FIG. 8 is a reflection spectrum of a wire grid polarizer with the reflection control layer $SiO_2$\Zr\$SiO_2$ on the front and back sides of the glass slide+Al layer.

The reflection and transmission spectra performances of glass substrate+reflection control layer and glass substrate+Al+reflection control layer obtained from FIGS. 4 and 5 are applied on a wire grid polarizer and the results are summarized in FIGS. 6-8. In some embodiments, the coating layers are embedded in a laminate, which includes but not limited to polyurethane or urethane adhesive laminate or the imprint material. Embedding the layers in a laminate is important because the adhesive or the imprint material becomes the incident media and not the air. The refractive index of the adhesive or the imprint material are nearly close to 1.5 which is greater than air.

FIG. 6 shows a transmission spectrum with the reflection control layer (i.e., 70 nm $SiO_2$\7 nm Zr\65 nm $SiO_2$ layer) or without the reflection control layer. As can be seen from FIG. 6, the transmission increases from about 35% to about 48% in the visible region, when the Al wires of the grid polarizer do not include the reflection control layer. FIG. 6 also shows that when the Al wires of the grid polarizer include the reflection control layer, there is a smaller increase in transmission from about 15% to about 35% compared to the transmission spectra when no reflection control layer present on the Al wires. It can be concluded from the transmission spectra in FIG. 6 that the transmission of the wire grid polarizer with the reflection control layer is reduced due to the absorption of the incident light in the high absorbing Zr layer.

FIG. 7 shows the reflection spectra of the wire grid polarizer when the front surface and the back surface comprise no $SiO_2\backslash Zr\backslash SiO_2$ reflection control layer. The near superimposition of the reflection spectra when the front surface and the back surface comprise no $SiO_2\backslash Zr\backslash SiO_2$ reflection control layer emphasizes the importance of the reflection control layer in reducing the reflection both on the front and the back surface of the wire grid polarizer.

FIG. 8 shows reflection spectra of the back surface (Al only) and the front surface (Al+reflection control layer) of the wire grid polarizer. In the back surface, i.e., Al surface through polyurethane laminate, the reflection increases from about 18% to about 45% in the visible region. However, for the front surface, the reflection reduces from about 18% to about 12% when the front surface comprises Al+reflection control $SiO_2\backslash Zr\backslash SiO_2$ layer. In some embodiments, the reflection is reduced by a factor of 3-4 through most of the visible region.

The key factor that determines the performance of a wire grid polarizer is the relationship between the center-to-center spacing, sometimes referred to as period or pitch, of the parallel grid elements and the wavelength of the incident light. The dimension of period or pitch between parallel grid may decrease if the thickness of the grids increases. A limitation of the reflection control layer of 70 nm $SiO_2$\7nmZr\65 nm $SiO_2$ described above is the required layer thickness of the coating and related complexity. The $SiO_2$\7 nm Zr\65 nm $SiO_2$ reflection control layer requires at a minimum two additional materials with a combined thickness of about 140 nm of the reflection control layer. This thickness is larger than the required dimension of the period of the wire grid polarizer structure. Therefore, the reflection control layer of 70 nm $SiO_2$\7 nm Zr\65 nm $SiO_2$ may not be incorporated at an angle on top of the Al grids which would help to recover a portion of the transmission. Hence, an alternate reflection control coating is needed in which thickness of the coating is smaller than the period of the wire grid polarizer and the reflection control layer can be incorporated at an angle on top of the Al grids.

Nature Materials; Vol 12; 2013 by M. Kats et. al., which is incorporated herein in its entirety by reference, has used highly absorbing non-metallic layers to reduce the reflectivity of the Al grids in a wire grid polarizer. According to some embodiments of the present invention, an alternate reflection control coating comprising non-metallic layer includes but not limited to $ZrO_xN_y$. $ZrO_xN_y$ is selected since the material can be modified from reflective metal nitride, like ZrN, absorbing metal oxynitride, like $ZrO_xN_y$ and transparent metal oxide, like ZrOx.

Figures 9, 10:
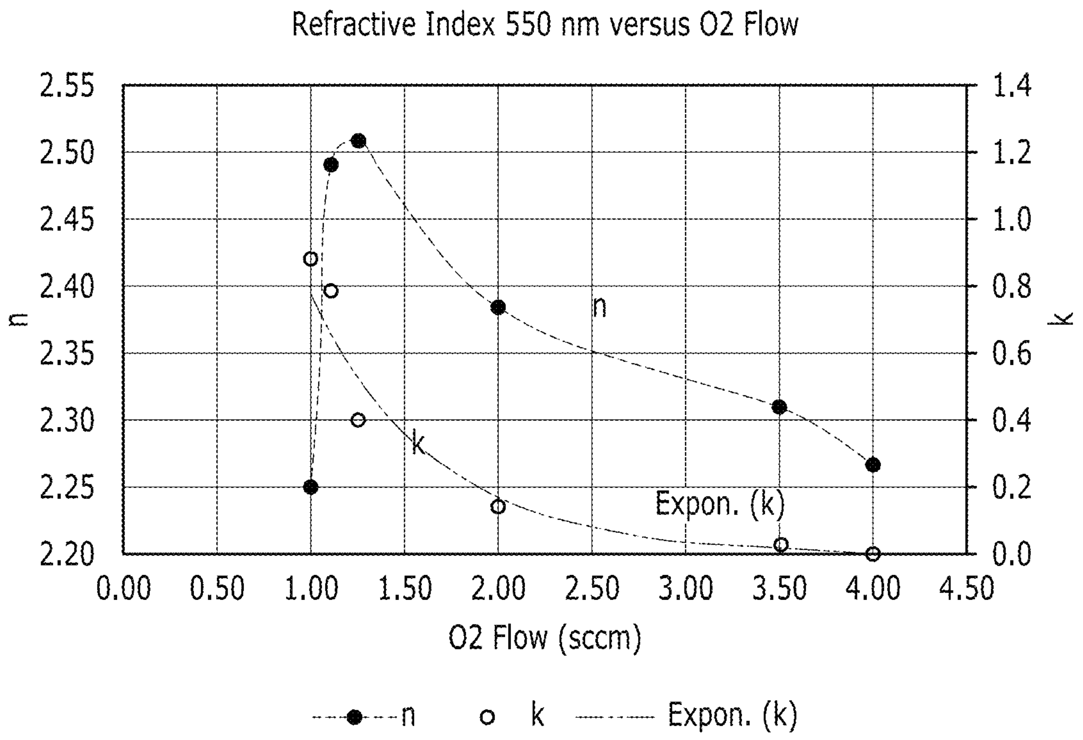
FIG. 9 is a plot showing refractive indices and extinction coefficients for $ZrO_xN_y$ coating.
FIG. 10 is a table showing important refractive indices including $ZrO_xN_y$, Zr and Al.

The optical properties of the highly absorbing $ZrO_xN_y$ layer have been evaluated by depositing all the films in sub stoichiometric and/or towards the metallic side of the compositions. The resulting refractive indices (n) and extinction coefficients (k) are shown under different oxygen flow rates in FIG. 9. FIG. 10 shows the important refractive indices (n) for modeling considerations. Based on the modelling data, the n value for Al-My coat ($SiO_2\backslash Zr\backslash SiO_2$ coating) is 1.4874. Whereas the n values of $ZrO_xN_y$ are much higher (greater than 2.0) than Al-My coat under different nitrogen and oxygen flow rates. Hence, based on the n values, high absorbing $ZrO_xN_y$ coating on the Al grids is a better option as a reduction control layer for the Al grids.

Figure 11:
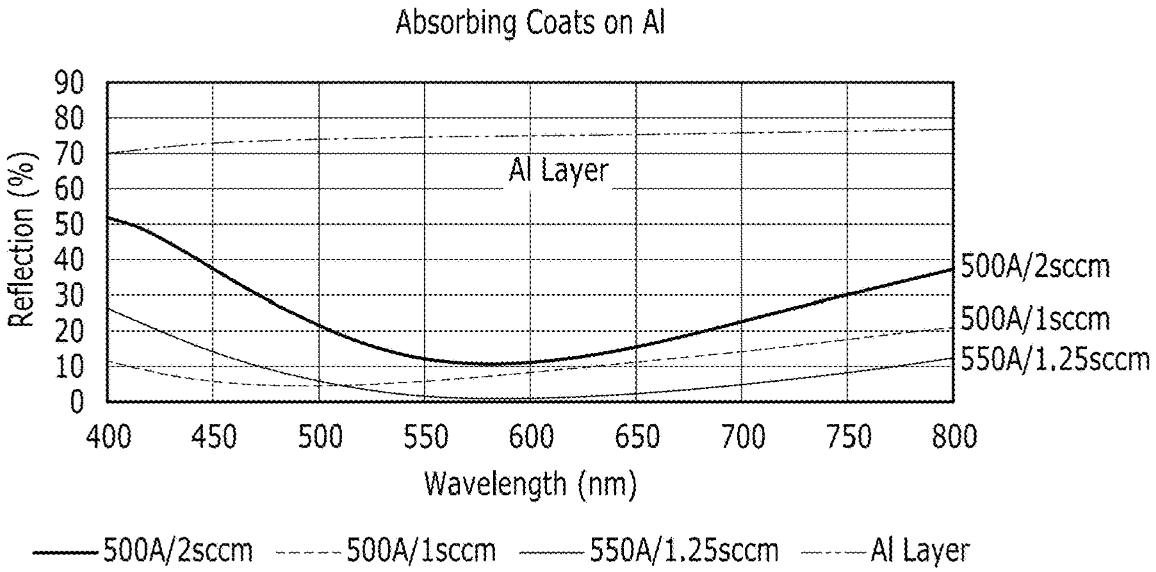
FIG. 11 is reflection spectra of Al (control layer) and $ZrO_xN_y$/Al/$ZrO_xN_y$ stacks with the different target thicknesses of $ZrO_xN_y$ coatings under different gas flows.

Using the above n data, stacks of $ZrO_xN_y/Al/ZrO_xN_y$ are assembled on glass slides. The purpose of this coating assembly is to examine the reduction of the reflectance by the coating layers under different conditions, for example, using different thickness of the $ZrO_xN_y$ and under different oxygen flow rates. A sample of the resulting data set is shown in FIG. 11. In FIG. 11, glass slide-Al was used as a control and a reflection of about 70% to about 78% was obtained for the glass slide-Al. The high reflection data for glass slide-Al was the result of the absence of any reflection reduction layer coated on the Al grids. It can be further seen from FIG. 10 that the stacks of $ZrO_xN_y/Al/ZrO_xN_y$ are seen to substantially reduce the reflection of the incident light. The lowest reduction of the reflection is achieved when the thickness of the $ZrO_xN_y$ was 550A under a gas flow rate of 1.25 sccm. The reflectance of these $ZrO_xN_y/Al/ZrO_xN_y$ stacks can be as low as 3.61 (luminous reflectance) when measured through the glass slide. Measuring through the glass is a simulated match to the appearance through a laminate structure surrounded by PUA and urethane adhesive. The coating thickness in $ZrO_xN_y/Al/ZrO_xN_y$ is 145 nm which considers reflection control from both front and back surface reflections. This is half the thickness of the metal dielectric reflection control layer of $SiO_2\backslash Zr\backslash SiO_2$ and also exhibits improved performance of reduction in reflection.

Figure 12:
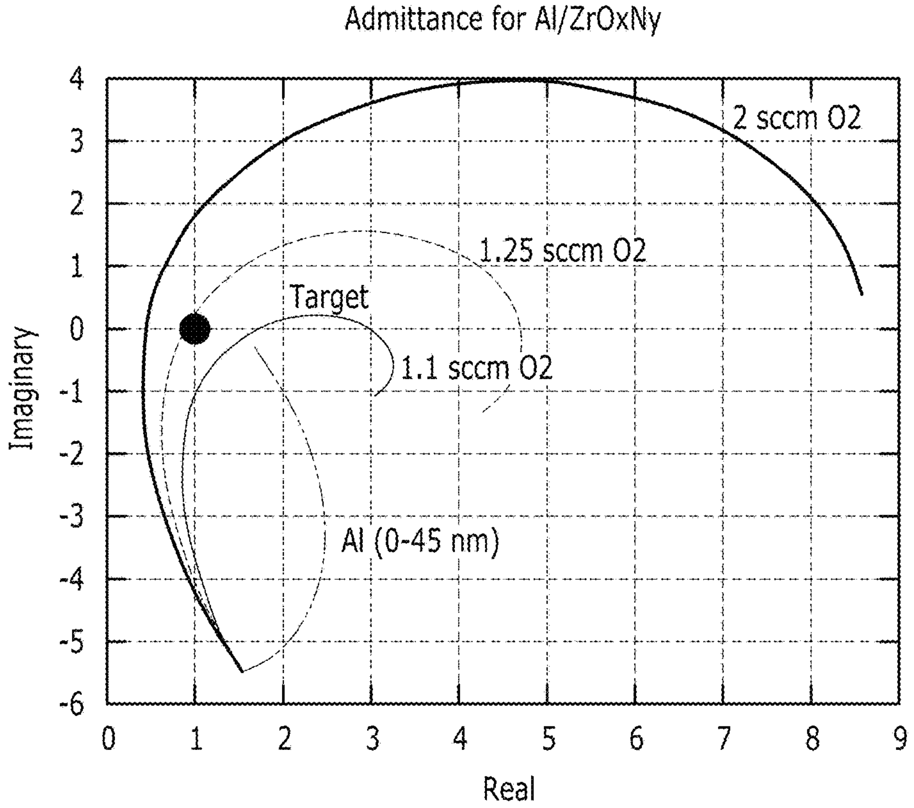
FIG. 12 is an optical admittance diagram for Al/$ZrO_xN_y$ coating.

Thin-Film Optical Filters; IOP Publishing; 2001 by MacLeod, the content of which is hereby incorporated in its entirety, shows how the admittance of a coated layer is calculated based on the refractive indices of coating layers. Using the refractive index data from FIG. 10, modeling of the admittance of the coating stack $ZrO_xN_y/Al/ZrO_xN_y$ was performed in Matlab to better understand the results. FIG. 12 shows the optical admittance diagram for $ZrO_xN_y/Al/ZrO_xN_y$ coating. As can be seen from FIG. 12, the index corresponding to a gas flow of 1.25 sccm oxygen passes closest to the target value for optical admittance.

Figures 13, 14:
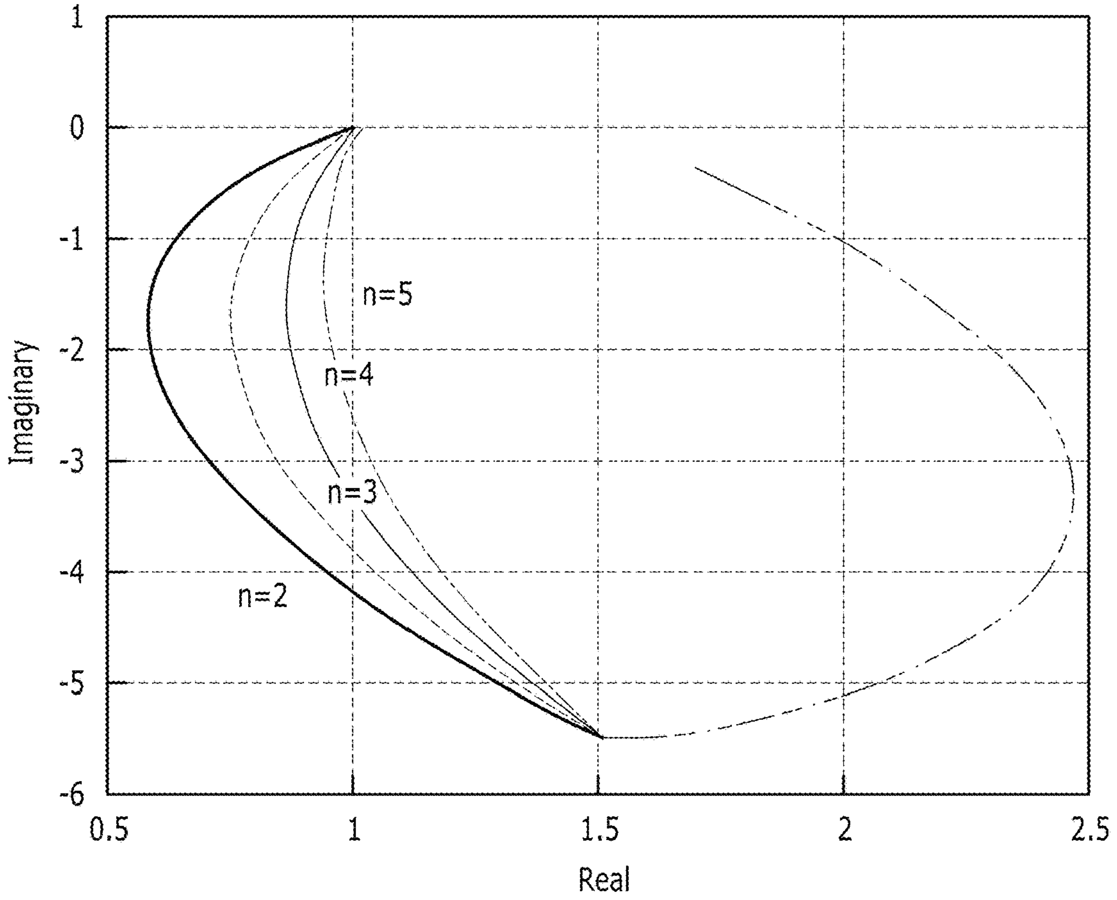
FIG. 13 is a table of required extinction coefficient and thickness to minimize reflection from Al calculated using admittance calculator.
FIG. 14 is plot showing admittance loci for different refractive indices.

To optimize the performance of the reflection control layer, it is important to consider the effect of the refractive index on reducing the thickness of the reflection control layer. Hence, using the admittance calculator, the combination of the extinction coefficient and required thickness to minimize the reflection from an Al layer were back calculated. The back calculations of the extinction coefficient (k) and thickness (d) are summarized in FIG. 13. It can be seen from the last row in the table in FIG. 13 that to obtain the lowest value of the coating thickness on top of the Al layer, a coating material with as high refractive index as possible is needed. In FIG. 13, calculation shows that to achieve the lowest value of 15 nm coating thickness, the required refractive index value is 5.

FIG. 14 discloses admittance trajectories for different refractive indices. FIG. 14 also confirms that a coating layer with high refractive index is needed to reduce the thickness of the reflection control layer. Based on the modelling data of FIGS. 13 and 14, it was decided to pursue high refractive index absorbing materials as a reflection control layer. Several materials were considered and shown in the table in FIG. 15.

Figures 15, 16:
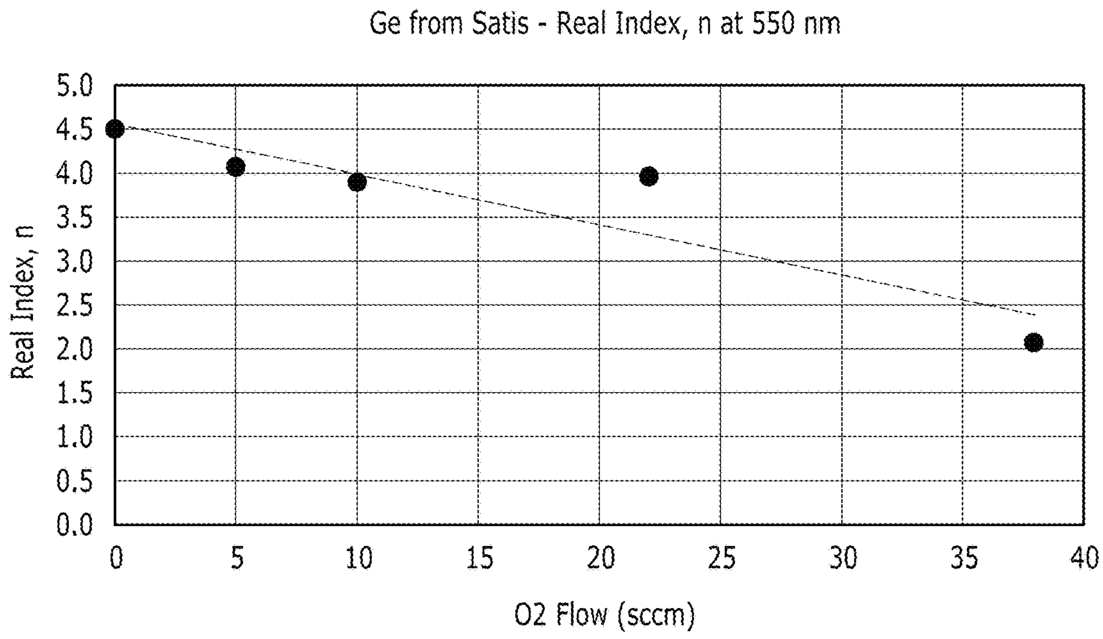
FIG. 15 is a table showing refractive indices of different materials at 550 nm.
FIG. 16 is a plot showing refractive indices of Ge under different $O_2$ flows by E-beam evaporation.

It can be seen from FIG. 15 that a good choice of material is Germanium (Ge) due to the high refractive index of 5.226. However, the extinction coefficient (k, 2.106) of Ge is higher than the desired value based on the admittance calculations in FIG. 13 that showed the desired extinction to be nominally 0.25. It is therefore important to see what the refractive index of the Ge films deposited on Al grids by E-Beam evaporation are in reality. The incorporation of background oxygen and porosity is expected to have some impact on the refractive index of Ge.

Figure 17:
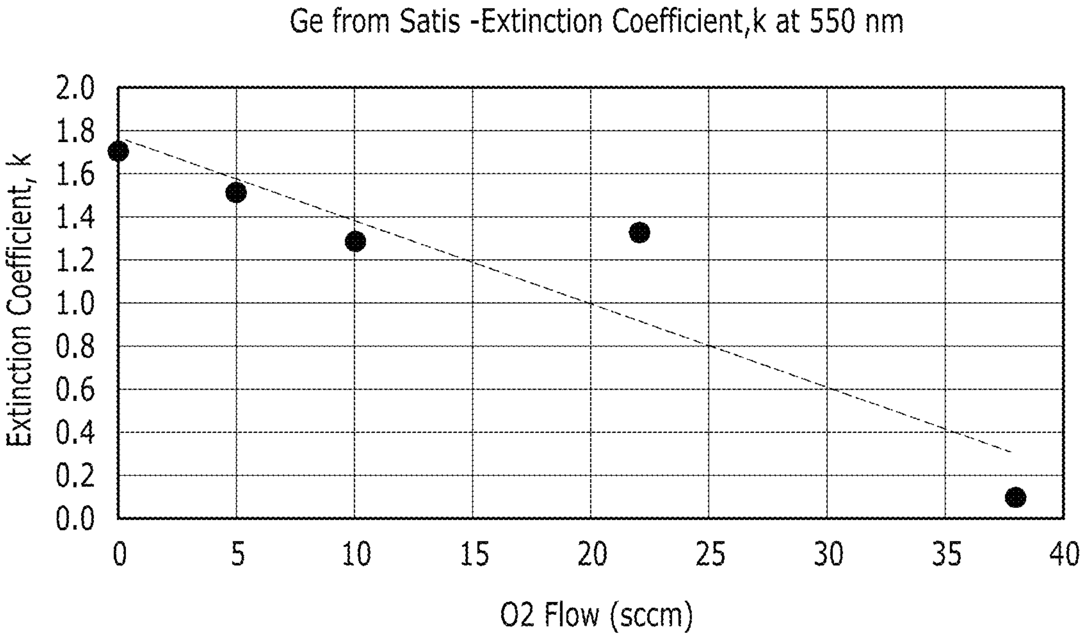
FIG. 17 is a plot showing extinction coefficients of Ge under different $O_2$ flows by E-beam evaporation.

FIGS. 16 and 17 show real refractive index (n) and extinction coefficient (k) data when the Ge films are deposited on Al grids by E-Beam evaporation and the n and k values were measured under different oxygen flow rate and a coating thickness of 550 nm of Ge layer. It can be seen from FIGS. 16 and 17 that the highest refractive index of Ge is approximately 4.5 with an extinction coefficient of 1.7.

Based on the above data, a structure of Ge/Al/Ge and Al/Ge were deposited on patterned samples. A reference sample of Al only coating was also included. This was compared against an earlier prepared sample (Al 112118 Control) that had been patterned and metallized. The resulting maximum transmission and reflection spectra are shown in FIGS. 18-21.

Figure 18:
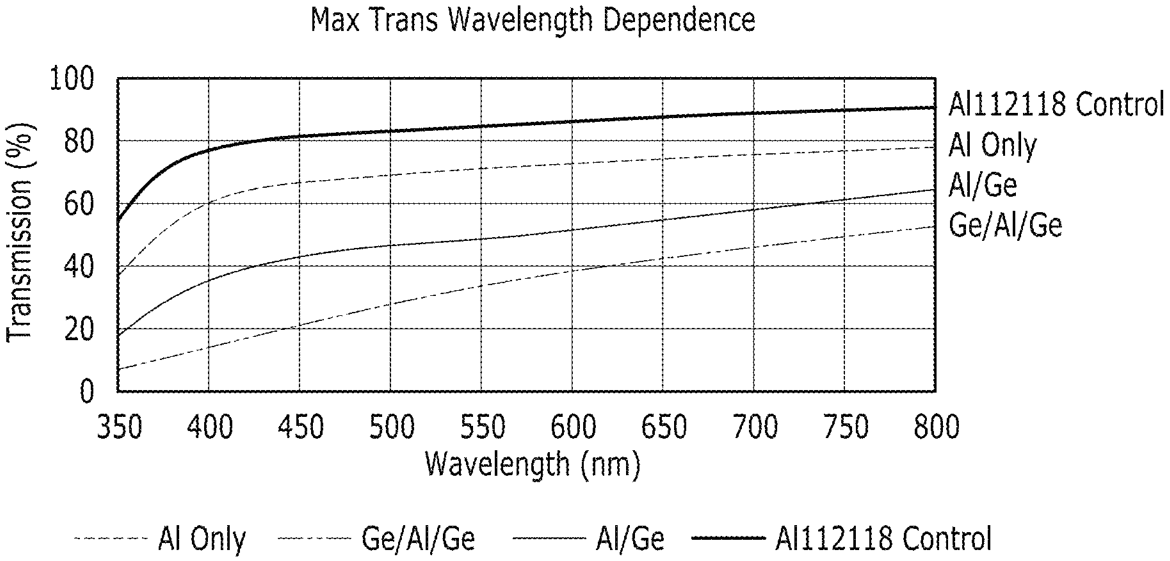
FIG. 18 is maximum transmission spectra of polarized light for coatings on patterned samples.

FIG. 18 shows that the highest values of the maximum transmission were obtained for the two Al only coatings (for example, Al only and Al 112118) which were devoid of reflection control Ge coating. The two Al only coatings, however, show different levels of maximum transmission of the polarized light. The difference in maximum transmission between two Al only coatings may be attributed to the patterning or quality of the Aluminum coating. It can be also seen from FIG. 18 that the lowest value of the maximum transmission was obtained when the coating structure is Ge/Al/Ge. The maximum transmission of the coating structure of Al/Ge was higher than the coating structure of Ge/Al/Ge. The added layer of Ge may have contributed to the lowering of the maximum transmission in Ge/Al/Ge. As can be seen from FIG. 18 that the Al only samples show an increase in maximum transmission at low wavelengths and the addition of the Ge suppresses this increase. It is further evident from FIG. 18 that the presence of two Ge in the coating structure reduces the transmission more than when the coating structure comprises one Ge.

Figure 19:
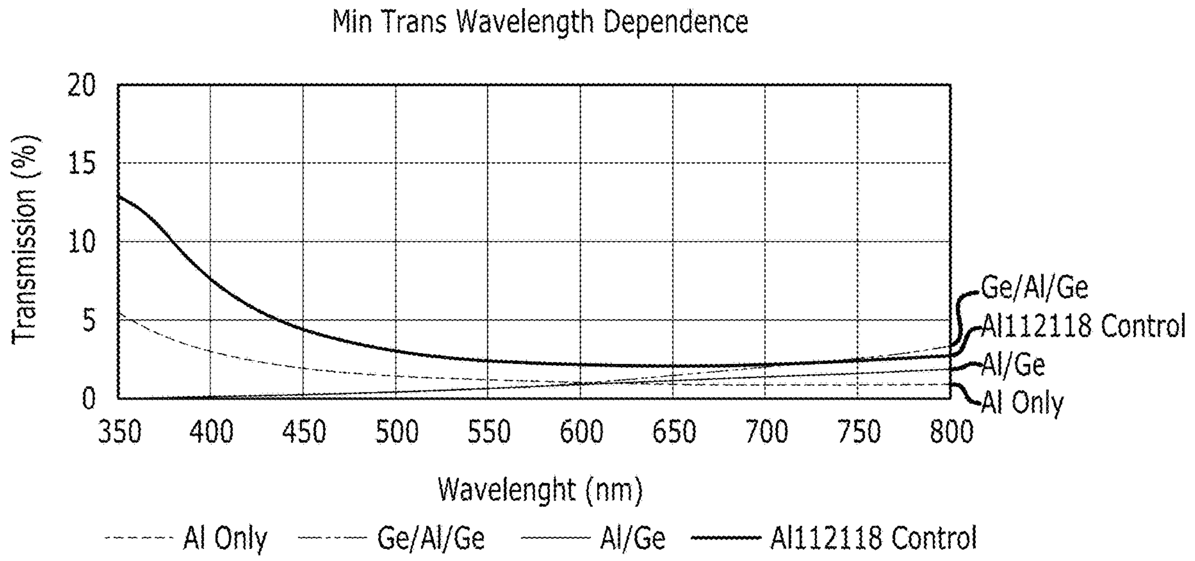
FIG. 19 is minimum transmission of polarized light for coatings on patterned samples.

FIG. 19 discloses the minimum transmission values of the two Al only coatings which were used as control and the coating structures of Ge/Al/Ge and Al/Ge. It is clear from FIG. 19 that the minimum transmission drops for both the Al only control coatings at lower wavelengths. The coating structure of Ge/Al/Ge shows slight increase in minimum transmission compared to the minimum transmission spectra of Al/Ge.

Figure 20:
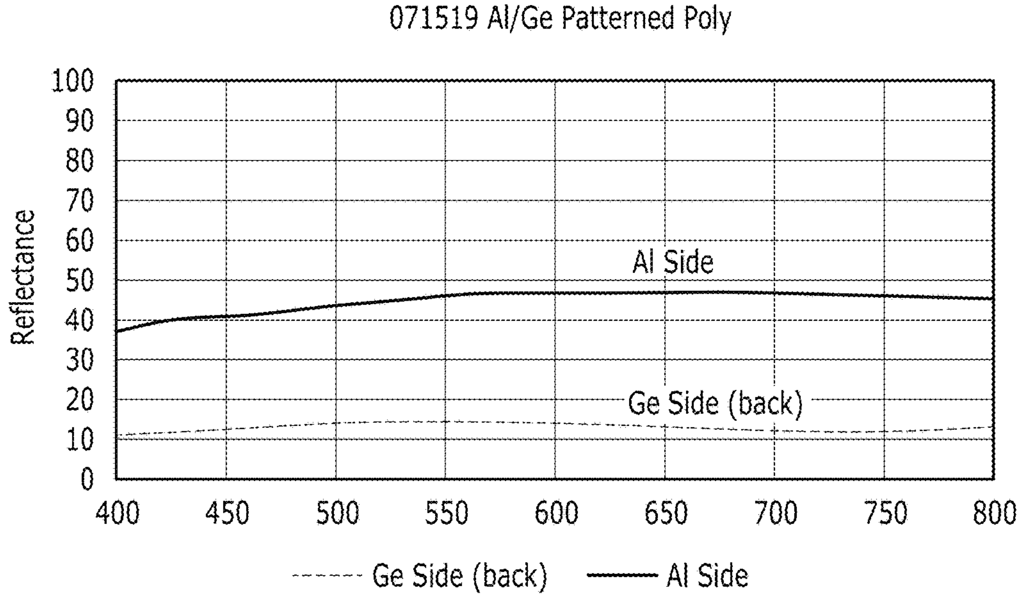
FIG. 20 is reflection spectra from Ge side and Al side of patterned sample. The coating structure is PUA/Al/Ge.
Figure 21:
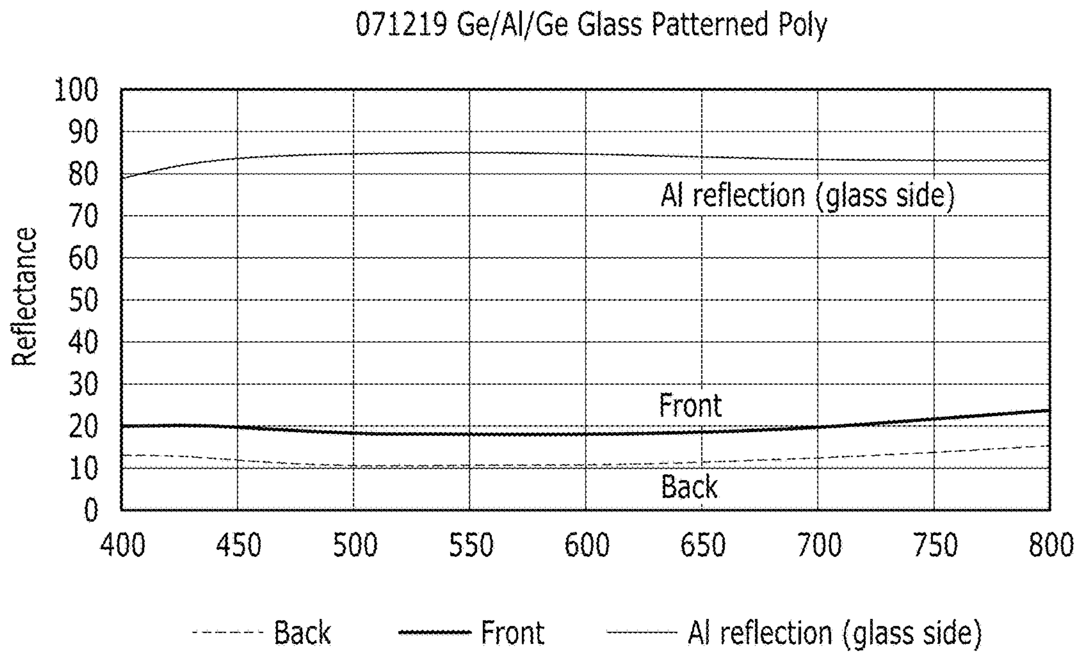
FIG. 21 reflection spectra from front and back of patterned samples with Ge/Al/Ge coating and Al reflection spectra as a reference.

FIGS. 19, 21 show reflectance spectra of the coating structures of Ge/Al/Ge and Al/Ge. It is to be noted that in the Al/Ge coating, Ge is present in the back side of the coating, i.e., the side facing the wearer's eyes. FIG. 20 shows the reflectance of Al/Ge coating. The Al-side, the side facing the observer, shows much higher reflectance, whereas, Ge side, the side facing the wearer's eyes shows much smaller reflectance compared to the Al-side. In some embodiments of the present invention, this coating structure will minimize reflection into the eyes of the wearer but provide a mirror like appearance to an observer. According to some embodiments, this coating structure can be used to reduce reflection but can also be used to impart a specific color or appearance in reflection by choosing an appropriate thickness.

FIG. 21 shows reflectance of the coating structure of Ge/Al/Ge from front and back sides using the glass slide-Al as a reference. The Ge layer reduces the reflection by a factor of 3.5. The reduction is larger (greater than 4) when looked at through the polycarbonate film and PUA in which the coating structure of Ge/Al/Ge is embedded in a PUA or polycarbonate laminate. This is more indicative of the final appearance in a laminate form. Since the reflection measurements include the reflection of the polycarbonate (for back surface measurements), the back surface reflection is increased by 5%. Hence, it can be concluded from the reflection data of FIGS. 20 and 21 that the reflection reduction works quite well in the coating structure of Ge/Al/Ge.

Figure 22:
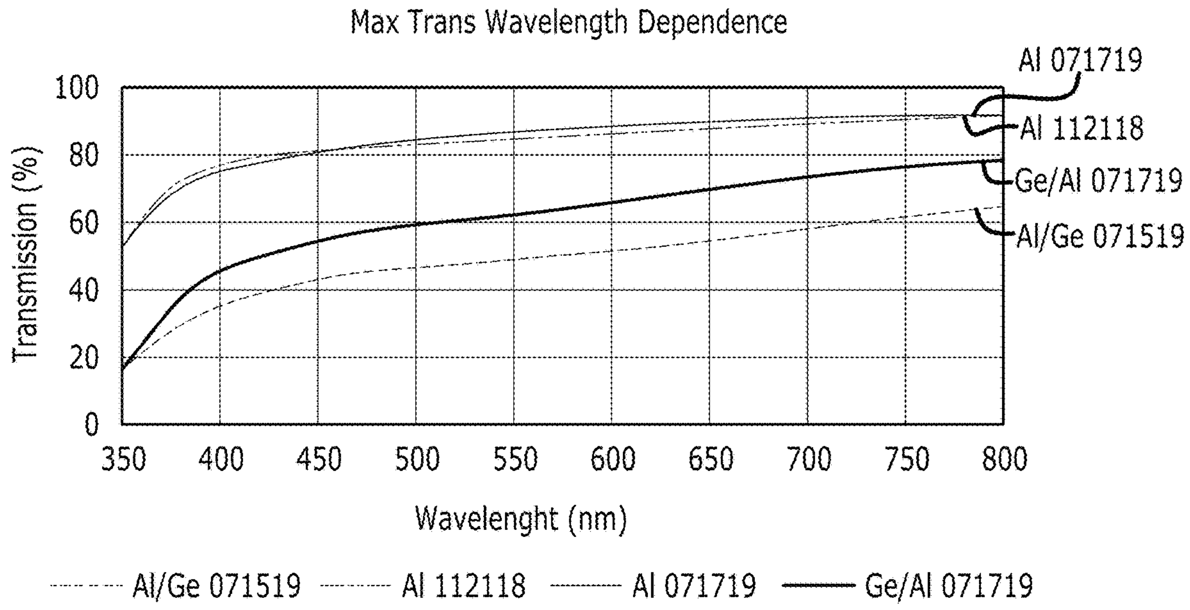
FIG. 22 is transmission plots after modification of Al process with and without Ge.

The reduction in transmission for the coating structures of Ge/Al/Ge and Al/Ge is problematic as shown previously in the maximum transmission spectra in FIG. 18 and minimum transmission spectra in FIG. 19. To understand the reduction of transmission for the Ge/Al/Ge and Al/Ge, first, the Al quality was investigated, and the quality appears to cause a general reduction in the transmission when compared against the previous control. To improve the quality of Al, the deposition conditions were modified by decreasing the angle and thickness of the deposition. The resulting transmission scans for patterned Al under these conditions is substantially improved and shown in FIG. 22. FIG. 22 shows that the transmission pattern quality of the Al only coating matches with the control coating Al 112118.

FIG. 22 further shows a comparison of the two Al deposition conditions, one with Ge present on the outside of the Al (Ge/Al, sample no. 071719) and the other with Ge present on the back side of the coating stack (Al/Ge, sample no. 071519). The transmission for Ge/Al shows substantial increase with Ge present on the outside of the Al. However, the transmission value is still lower than the Al only samples. The cause for this lower value of transmission of Ge/Al layer in comparison to the Al only samples may stem from that fact that the total layer thickness being comparable to the spacing between pillars allowing coupling.

To understand further the lower value of transmission of Ge/Al layer in comparison to the Al only samples, SEM imaging was performed of the samples. SEM imaging will also help to better understand the mechanisms for reflection reduction. Three samples were compared: (i) a replicate with no metallization or coating (bare pattern); (ii) an aluminum coated sample; and (iii) a sample coated with Ge+Al. SEM images of these samples are shown FIG. 23. The samples in ii) and iii) correspond to sample nos. 071719 (Al only) and 071719 (Ge/Al) as disclosed in FIG. 22.

Figure 23:
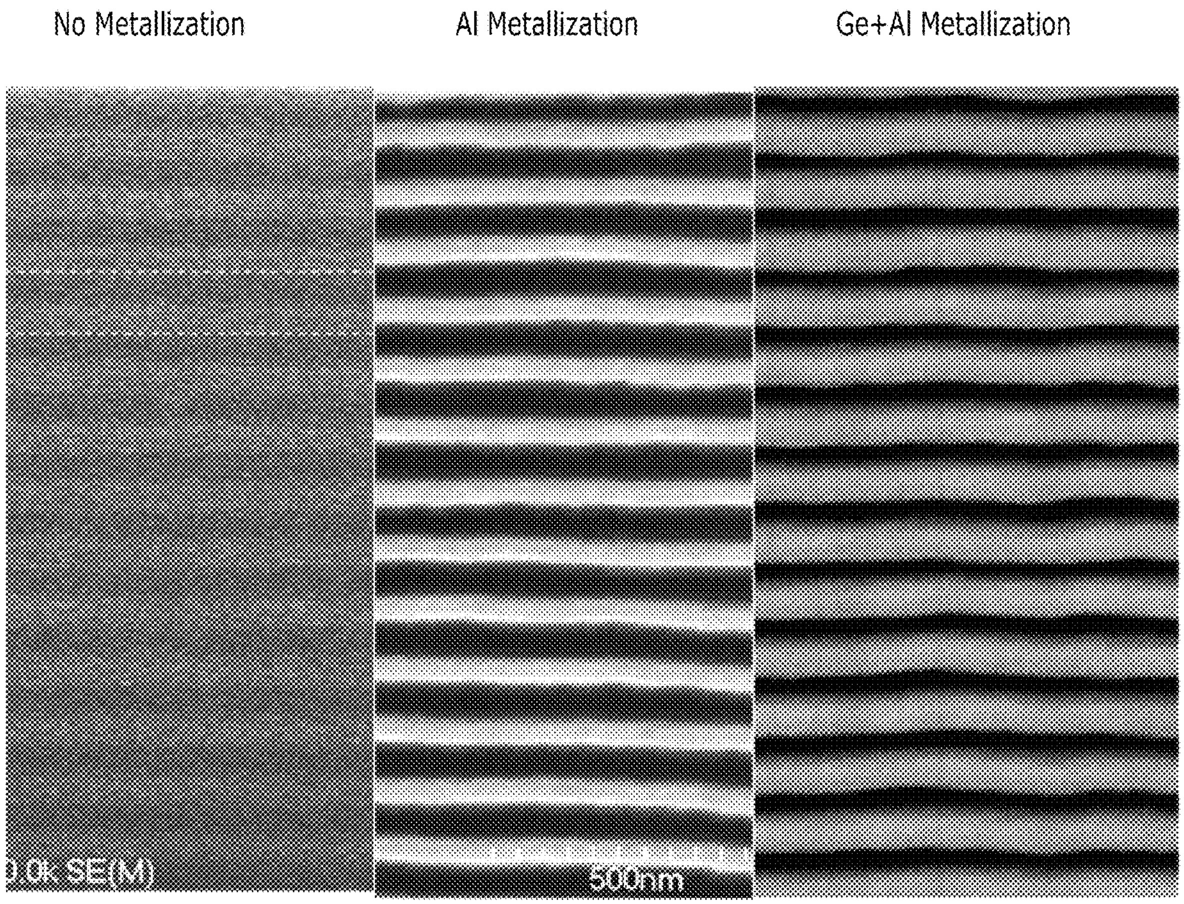
FIG. 23 is comparative SEM images of (i) initial pattern (no coating); (ii) Al coated sample; (iii) Ge—Al coating.

The SEM imaging of FIG. 23 clearly shows that while the Al thickness between Al coated sample (ii) and Ge/Al coating (iii) is held constant, however, in Ge/Al layer, there is a reduction of spacing between the adjacent grids with increased coating thickness of Ge and Al together.

Figure 24:
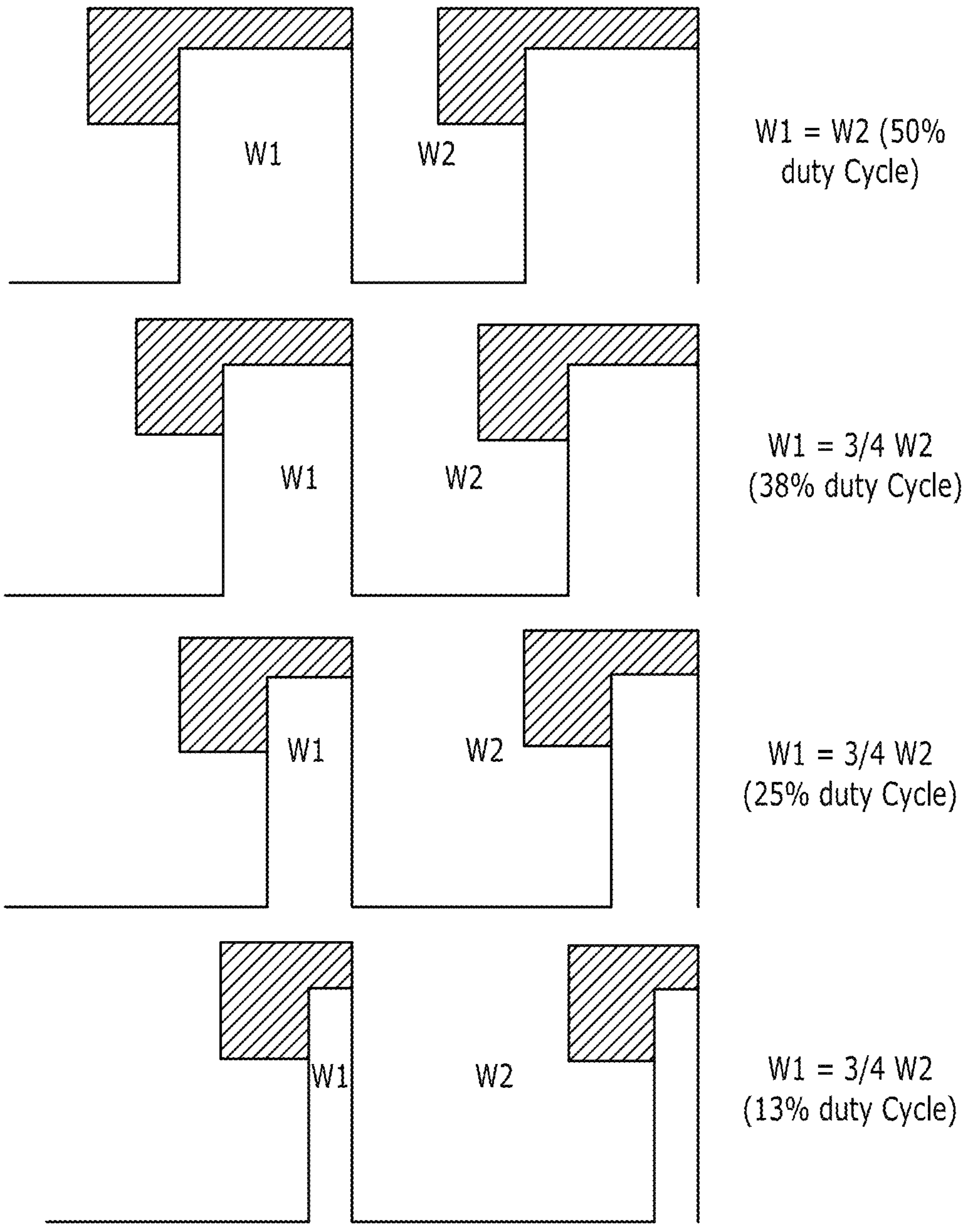
FIG. 24 is a schematic representation of modification of the wire grid polarizer period to control the spacing between wires or grids.
Figure 25A:
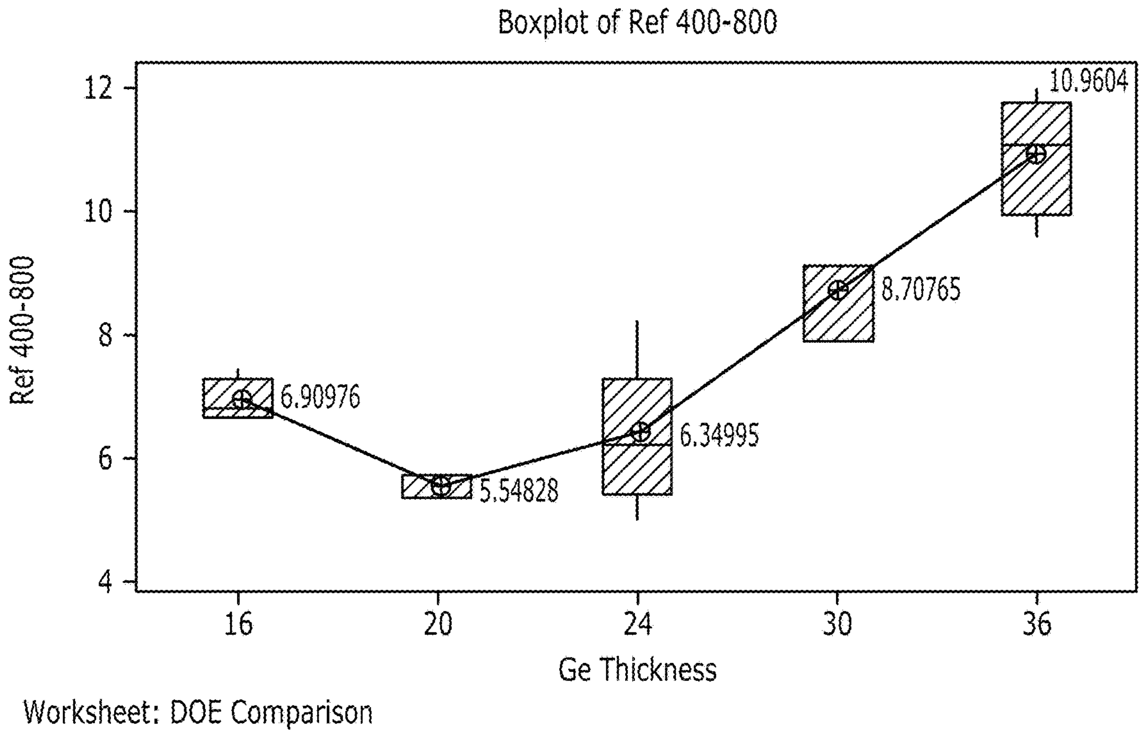
FIG. 25A is a plot showing reflection of Ge with corresponding Ge thicknesses under 400-800 nm of light.
Figure 25B:
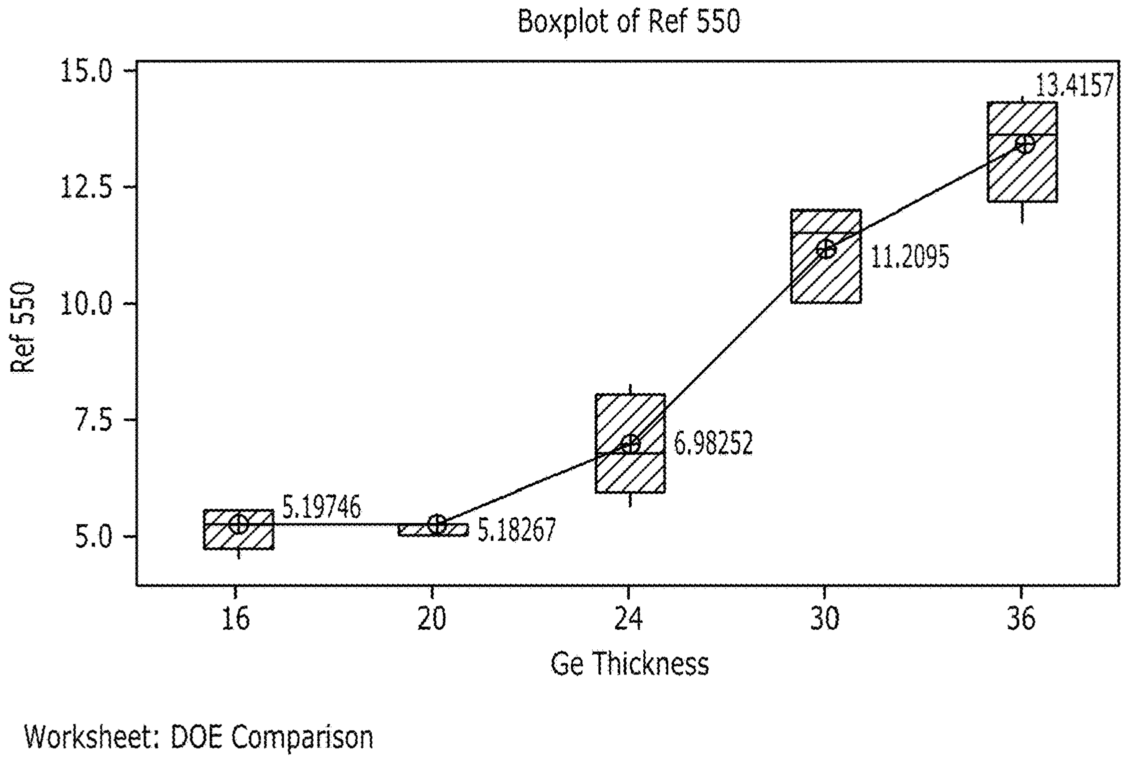
FIG. 25B is a plot showing reflection of Ge with corresponding Ge thicknesses under 550 nm of light.
Figure 25C:
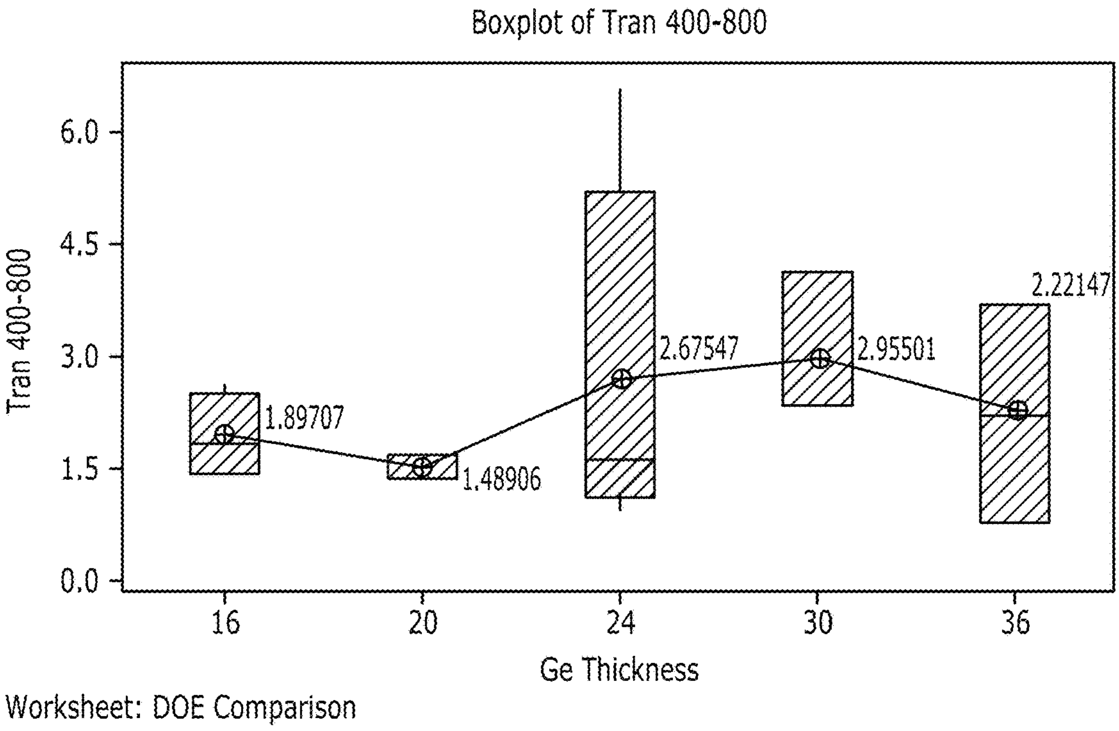
FIG. 25C is a plot showing transmission of Ge with corresponding Ge thicknesses under 400-800 nm of light.
Figure 25D:
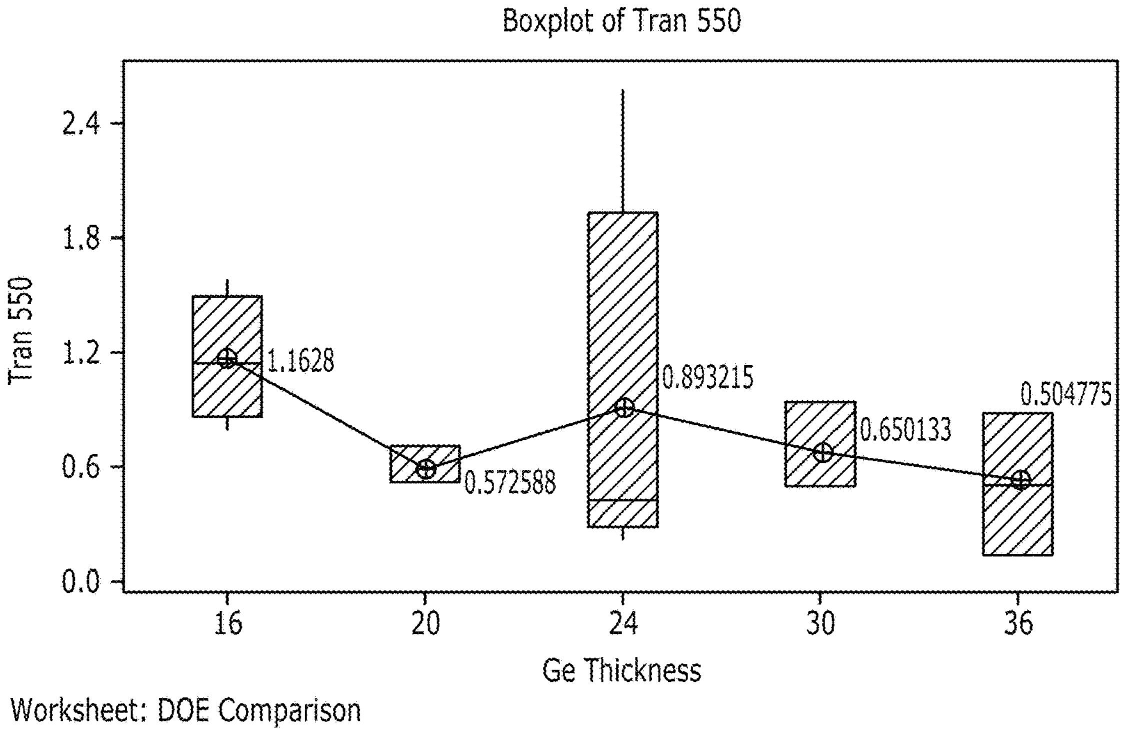
FIG. 25D is plot showing transmission of Ge with corresponding Ge thicknesses under 550 nm of light.
Figure 26A:
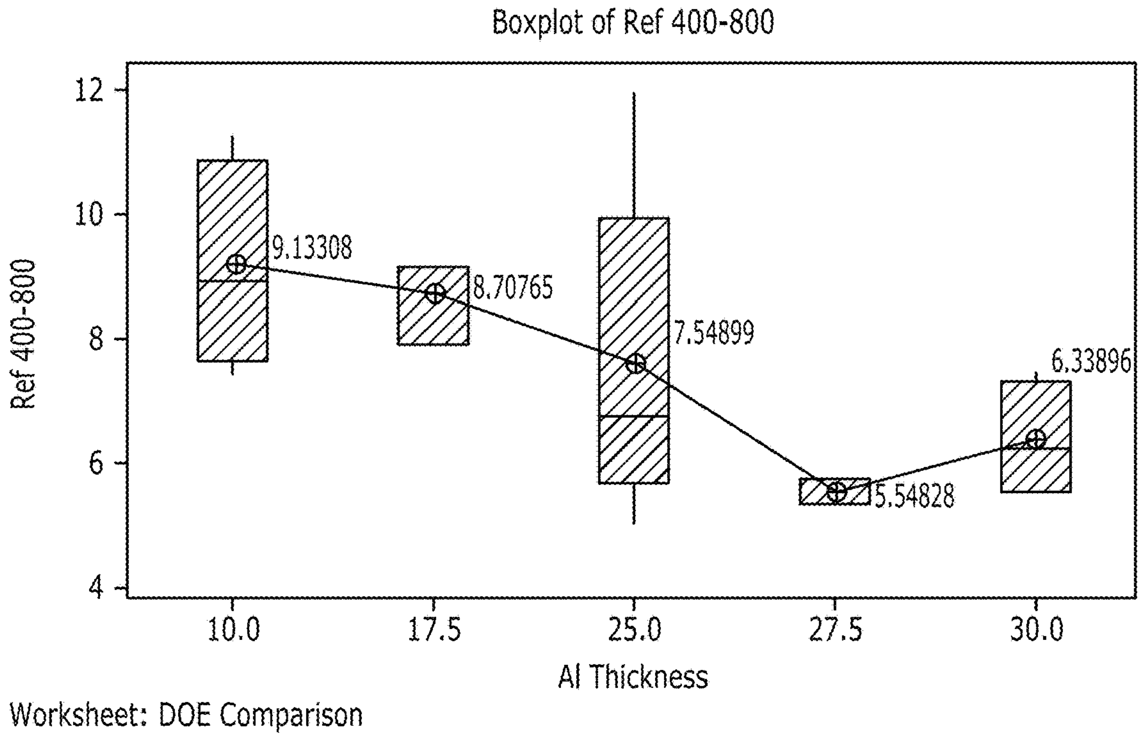
FIG. 26A is a plot showing reflection of Al with corresponding Al thicknesses under 400-800 nm of light.
Figure 26B:
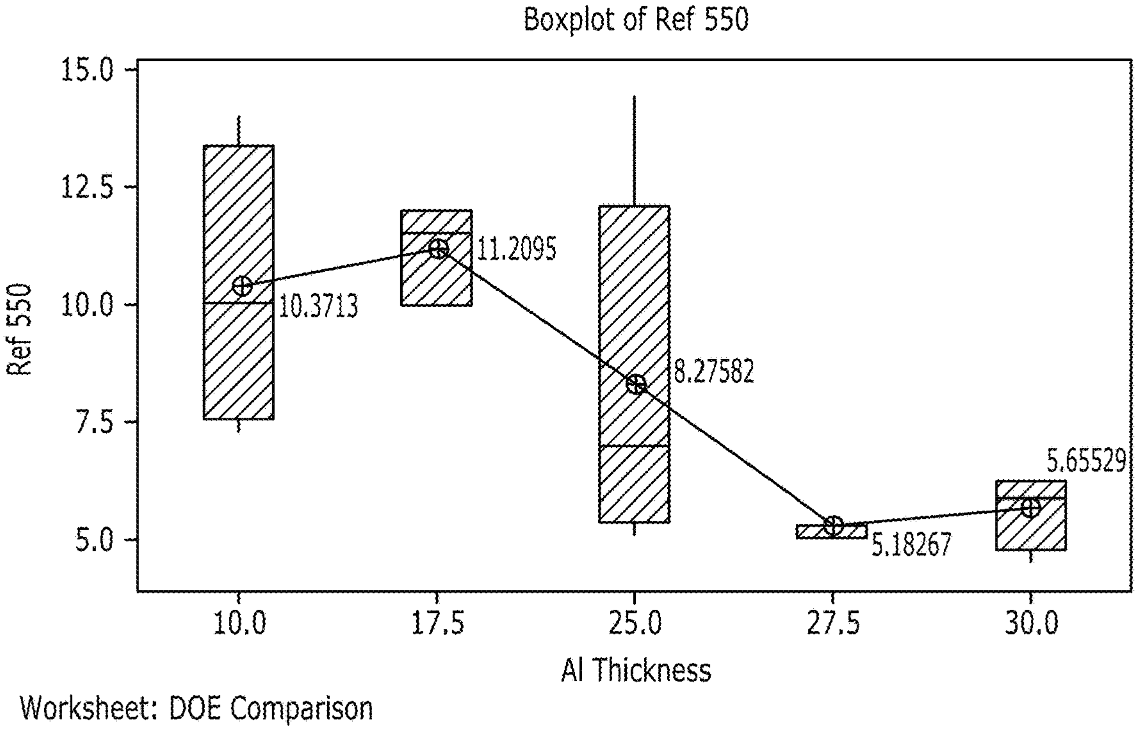
FIG. 26B is a plot showing reflection of Al with corresponding Al thicknesses under 550 nm of light.
Figure 26C:
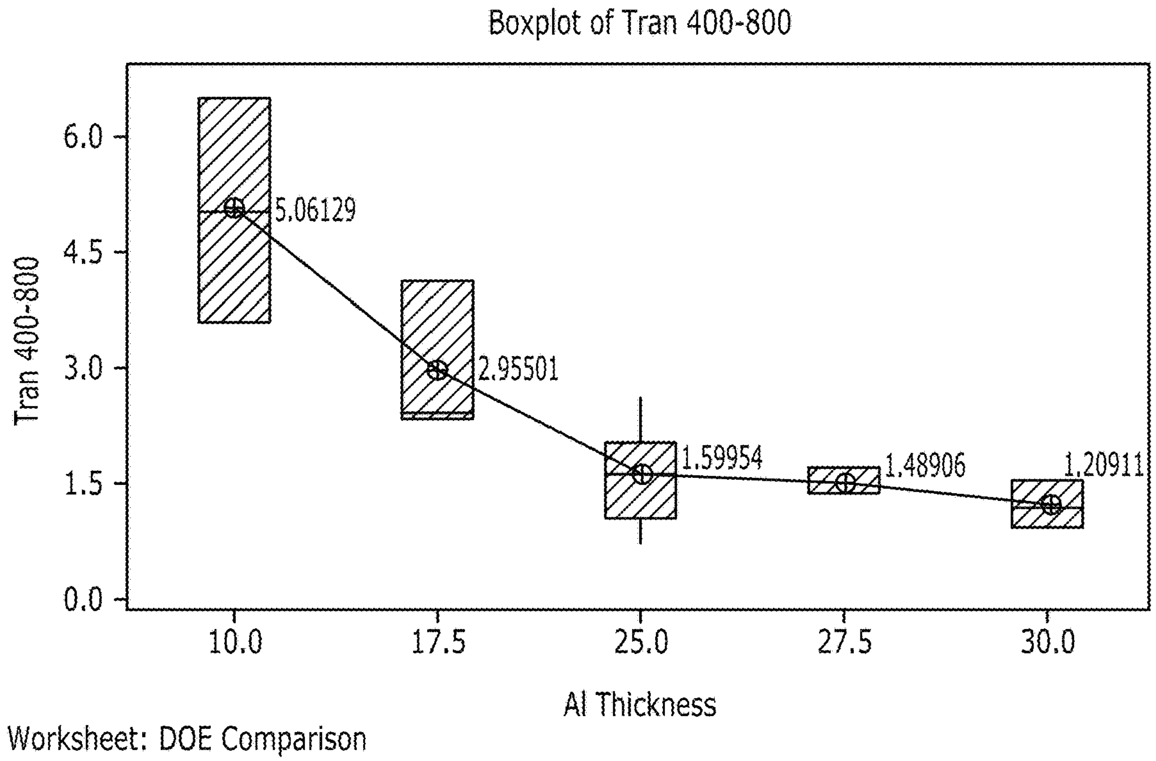
FIG. 26C is a plot showing transmission of Al with corresponding Al thicknesses under 400-800 nm of light.
Figure 26D:
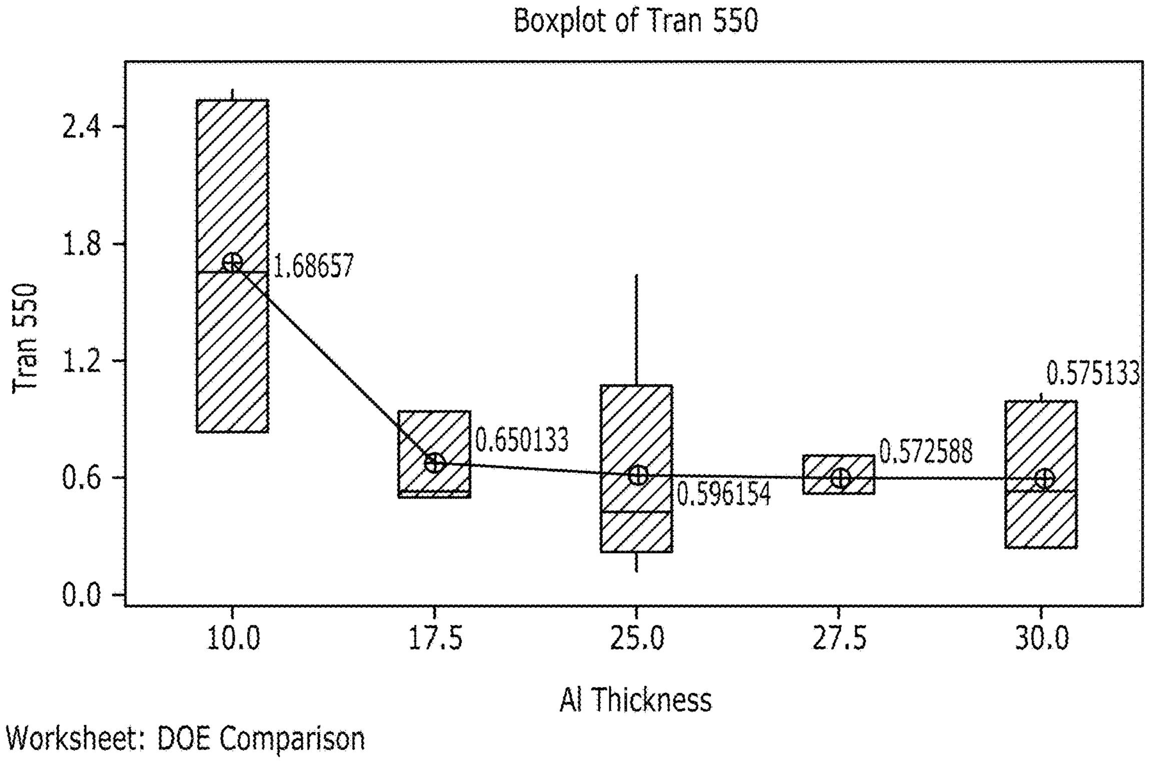
FIG. 26D is plot showing transmission of Al with corresponding Al thicknesses under 550 nm of light.

To overcome the issue of reduction of spacing between the adjacent grids, the duty cycle of the pattern may be modified, while the period of the pattern is held constant. Duty cycle can be defined as ratio of the pillar width to the total period of the pattern. By decreasing the duty cycle the spacing between pillars can be increased. This is shown schematically for four duty cycles in FIG. 24. In FIG. 24, the dark shaded areas on top of the pillars represents the applied coating. W1 is the pillar width and W2 the spacing between pillars. Increasing the spacing between pillars increases the spacing between wires. The Ge/Al pattern shown in FIG. 22 for the SEM imaging is 50% duty cycle. It is clear from FIG. 24 that with gradual decrease of the duty cycles from 50% to 13%, the spacing between the pillars (W2) and the spacing between the wires increases. This increase in spacing between adjacent wires will allow the incorporation of an additional Ge layer to the Ge/Al structure and hence, the reflection control coating structure of Ge/Al/Ge can be used while mitigating unwanted reductions in transmission or efficiency.

Optimization of Ge/Al Layers for Reflection Control:

To better understand the possible master designs of the reflection control coatings, it is necessary to figure out the required thicknesses of the Ge and Al layers in order to realize the minimum reflection. While it is known to those ordinary skill in the arts that it is possible to find out the thicknesses of the Ge and Al layers through computer modelling, it is, however, not possible to predict the exact index of the Ge and Al layers or possible interfacial mixing that may occur from the computer modelling. It is therefore necessary to perform a Design of Experiments to determine the optimized conditions. The Design Experiments of the coatings (Ge and Al layers) were performed on a flat glass slide (unpatterned) and the transmission and reflection measured from the back surface of the glass. In such an arrangement the goal is to minimize both the reflection and also the transmission.

The Design Experiments of the Ge-glass slide and Al-glass slide were performed varying the Ge and Al thickness from 16-36 nm for Ge and 10-30 nm for Al. The important metrics in the Design Experiments are transmission and reflection. Results are shown in FIGS. 25A, 25B, 25C, 25D and 26A, 26B, 26C, 26D. The transmission and reflection spectra for the Ge-thickness ranges (FIGS. 25A, 25B, 25C, 25D) and Al-thickness ranges (FIGS. 26A, 26B, 26C, 26D) are expressed in two ways—the average from 400-800 nm and specifically at 550 nm.

From the data in FIGS. 25A, 25B, 25C, 25D, it is clear that the target Ge thickness is nominally approximately 20 nm to achieve lowest reflection and transmission. From the data in FIGS. 26A, 26B, 26C, 26D, it is clear that the target Al thickness is about 27.5 nm to achieve lowest reflection and transmission. Therefore, the total thickness of the coating stack is 47.5 nm for a single surface Ge/Al reflection control. In some embodiments, such single surface Ge/Al reflection control may function as a polarized mirror sun lens. The total thickness of the coating stack is 67.5 nm for dual direction reflection control (Ge/Al/Ge). The average reflection is below 6% under these optimized conditions. Removing the back surface reflection of the glass slide, which is 4%, in some embodiments of the present invention, the average reflection is only 2%. Furthermore, for a WGP the reflection is only half this value or 1%. According to some embodiments, under such conditions, the transmission is still low with a value of about 1.5% under 400-800 nm. According to some embodiments, optimization of the thicknesses of the coated layers provides a polarization efficiency of greater than 90% and preferably greater than 95%.

In some embodiments, the use of a high index/Al/high index stack is capable of reducing the reflection from a WGP from between 40-50% to between 5-10%. Further reductions below 5% may be possible with refined patterns and optimized material selection based on the refractive index and extinction coefficient.

In some embodiments of the present invention, the high refractive index material is used to form a quarter wave layer. The desired refractive index for the high refractive index material is greater than 3 with extinction coefficients above 0.20. In some embodiments, the desired high refractive index materials include but not limited to Ge, Si and alloys of these materials.

The coating structure in a wire grid polarizer can reduce the spacing between pillars (and therefore wires) in the wire grid. This will reduce the performance of the polarizer (decreases in transmission and/or polarization efficiency, and greater wavelength dependence). In some embodiments of the present invention, increase in the spacing between pillars by applying duty cycles increases the spacing between wires and improves the performance of the wire grid polarizer.

In some embodiments of the present invention, the coated stack of the wires can be used to impart a specific color or appearance in reflection by choosing an appropriate thickness in addition to reducing the reflection. This could create the appearance of a colored mirror on one side and then low reflection on the back.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A wire grid polarizer for polarizing an incident light beam in an optical lens, comprising:

an array of parallel composite wires, wherein each of the composite wires comprises a coating stack having at least one material layer comprising a high absorbance of the incident light beam, coated on a metal layer having a high reflectivity of the incident light beam;

wherein the material layer having the high absorbance of the incident light beam faces a wearer's eye and the metal layer having the high reflectivity of the incident light beam is away from the wearer's eye to reduce a back reflection of the wire grid polarizer below 7% and the at least one high absorbance material layer comprises a first thickness of about 16-24 nm and the high reflectivity metal layer comprises a second thickness of about 26-30 nm in the coating stack.

2. The wire grid polarizer of claim 1, wherein the at least one high absorbance material layer comprises a first thickness of about 20 nm and is germanium.

3. The wire grid polarizer of claim 1, wherein the high reflectivity metal layer comprises a second thickness of about 27.5 nm and is aluminum.

4. The wire grid polarizer of claim 1, wherein the at least one high absorbance material layer comprises a refractive index greater than 3.

5. The wire grid polarizer of claim 1, wherein the at least one high absorbance material layer comprises an extinction coefficient above 0.2.

6. The wire grid polarizer of claim 1, wherein the at least one high absorbance material layer comprises a germanium layer, a silicon layer or a layer comprising an alloy of germanium and silicon.

7. The wire grid polarizer of claim 1, wherein a polarization efficiency of the wire grid polarizer is greater than 95%.

8. The wire grid polarizer of claim 1, wherein the coating stack comprises a total thickness of about 47.5 nm when the at least one high absorbance material layer comprises the first thickness of about 20 nm and the high reflectivity metal layer comprises the second thickness of about 27.5 nm and the back reflection of the wire grid polarizer is below 6%.

9. The wire grid polarizer of claim 8, wherein the wire grid polarizer is a polarized mirror sun lens having a back surface reflection control when the coating stack comprises the total thickness of about 47.5 nm.

10. The wire grid polarizer of claim 8, wherein a transmission of the polarizer is about 1.5% under a range of 400-800 nm wavelengths of incident light.

11. The wire grid polarizer of claim 8, wherein the coating stack comprises a total thickness of about 67.5 nm when the high reflectivity metal layer comprising the second thickness of about 27.5 nm is sandwiched between two high absorbance material layers having the first thickness of about 20 nm.

12. The wire grid polarizer of claim 11, wherein the wire grid polarizer is a dual direction reflection controller when the coating stack comprises the total thickness of about 67.5 nm.

13. The wire grid polarizer of claim 12, wherein when the wire grid polarizer is the dual direction reflection controller, a spacing between the parallel composite wires increases by decreasing a duty cycle.

14. The wire grid polarizer of claim 13, wherein when the wire grid polarizer is the dual direction reflection controller, the spacing between the parallel composite wires increases by decreasing the duty cycle below 38%.

15. An optical lens comprising:

a wire grid polarizer having a substrate with a surface; an array of parallel wires disposed on the surface of the substrate, wherein each of the wires comprises a coating stack having a low refractive index metal layer having a high reflectivity of an incident light beam coated at least on one high refractive index material layer comprising a high absorbance of the incident light beam, wherein the coating stack is embedded in a laminate and the high refractive index material layer comprising the high absorbance of the incident light beam faces a wearer's eye and the low refractive index metal layer having the high reflectivity of the incident light beam is away from the wearer's eye to reduce a back reflection of the optical lens below 7% and the high refractive index material layer comprises a first thickness of about 16-24 nm and the low refractive index metal layer comprises a second thickness of about 26-30 nm in the laminate.

16. The optical lens of claim 15, wherein the wire grid polarizer of the optical lens is embedded in the laminate comprising a polyurethane adhesive, a urethane adhesive or a polycarbonate.

17. The optical lens of claim 15, wherein when the coating stack of the wire grid polarizer comprises a total thickness of about 47.5 nm, the optical lens appears as a colored mirror towards an observer and back reflects light below 2% to a wearer's eyes.

18. The optical lens of claim 15, wherein the wire grid polarizer of the optical lens comprises a glass substrate.

19. The optical lens of claim 18, wherein the coating stack of the wire grid polarizer of the optical lens is configured to reduce the back reflection of the optical lens to 2% when the glass substrate of the wire grid polarizer comprises a back surface reflection of 4%.

20. The optical lens of claim 15, wherein the coating stack of the wire grid polarizer comprises (A) the at least one high refractive index material layer being a Ge layer having a first thickness, and (B) an aluminum layer having a second thickness.

21. The optical lens of claim 20, wherein the coating stack of the wire grid polarizer comprises the at least one high refractive index Ge layer having the first thickness of about 20 nm and the aluminum layer having the second thickness of about 27.5 nm and the back reflection of the wire grid polarizer below 6%.

22. The optical lens of claim 21, wherein the coating stack of the wire grid polarizer comprises a total thickness of about 47.5 nm when the at least one high refractive index Ge layer comprises the first thickness of about 20 nm and the aluminum layer comprises the second thickness of about 27.5 nm.

23. An optical lens comprising:

a wire grid polarizer having an array of parallel wires, wherein each of the wires comprises a coating stack having at least one high refractive index material layer having a high absorbance consisting of pure germanium, wherein the wire grid polarizer comprises a high reflectivity material layer having a low refractive index being sandwiched between two of the high refractive index material layers having the high absorbance to reduce a front and back reflectance of the optical lens about greater than four times as compared to a wire grid polarizer comprising a grid having only the high reflectivity material layer having the low refractive index;

wherein the high refractive index material layer having the high absorbance comprises a first thickness of about 16-24 nm and the high reflectivity material layer having the low refractive index comprises a second thickness of about 26-30 nm in the coating stack of the optical lens.

24. The optical lens of claim 23, wherein a reduction of the reflectance of the optical lens is greater than the four times when the wire grid polarizer is embedded in a laminate.

25. The optical lens of claim 23, wherein a laminate embedding the wire grid polarizer comprises a polyurethane adhesive or a polycarbonate.

26. The optical lens of claim 23, wherein a reduction of the reflectance of the optical lens having the wire grid polarizer consisting of the pure germanium is greater than four times as compared to the wire grid polarizer comprising the grid of only the high reflectivity material layer having the low refractive index of aluminum.

27. The optical lens of claim 23, wherein a polarization efficiency of the lens is greater than 95%.

28. The optical lens of claim 23, wherein a transmission of the wire grid polarizer is about 1.5% under a range of 400-800 nm wavelengths of incident light.

* * * * *